US012080238B2

(12) United States Patent
Chai et al.

(10) Patent No.: US 12,080,238 B2
(45) **Date of Patent: *Sep. 3, 2024**

(54) DISPLAY DEVICE

(71) Applicant: SAMSUNG DISPLAY CO., LTD., Yongin-si (KR)

(72) Inventors: Yoon Jung Chai, Yongin-si (KR); Won Jun Lee, Yongin-si (KR); Chol Ho Kim, Yongin-si (KR); Sung Hoon Lim, Yongin-si (KR); Yoo Seok Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,459

(22) Filed: Jul. 18, 2023

(65) Prior Publication Data

US 2023/0368733 A1 Nov. 16, 2023

Related U.S. Application Data

(63) Continuation of application No. 17/853,129, filed on Jun. 29, 2022, now Pat. No. 11,749,195.

(30) Foreign Application Priority Data

Dec. 13, 2021 (KR) ........................ 10-2021-0178109

(51) Int. Cl.

| | |
|---|---|
| ***G09G 3/3233*** | (2016.01) |
| ***G09G 3/20*** | (2006.01) |
| ***G09G 3/3266*** | (2016.01) |

(52) U.S. Cl.

CPC ......... *G09G 3/3233* (2013.01); *G09G 3/3266* (2013.01); *G09G 3/2007* (2013.01); *G09G 2300/0426* (2013.01); *G09G 2300/0819* (2013.01); *G09G 2300/0842* (2013.01); *G09G 2310/0294* (2013.01); *G09G 2310/08* (2013.01); *G09G 2320/0252* (2013.01)

(58) Field of Classification Search

CPC ........................... G09G 3/3233; G09G 3/3256

USPC .......................................................... 345/204

See application file for complete search history.

(56) References Cited

U.S. PATENT DOCUMENTS

| | | | |
|---|---|---|---|
| 10,109,252 | B2 | 10/2018 | Cho et al. |
| 10,803,810 | B2 | 10/2020 | Takasugi |

(Continued)

FOREIGN PATENT DOCUMENTS

| | | | |
|---|---|---|---|
| KR | 1020170078978 | A | 7/2017 |
| KR | 1020200029178 | A | 3/2020 |

*Primary Examiner* — Prabodh M Dharia

(74) *Attorney, Agent, or Firm* — CANTOR COLBURN LLP

(57) ABSTRACT

A display device includes: active stages each include a scan output circuit outputting a scan clock signal to a first output terminal and a carry output circuit outputting a carry clock signal to a second output terminal, when a voltage of a first node is at a logic high level. The scan output circuit and carry output circuit output a scan signal of a turn-off level to the first output terminal when a voltage of a second node or a carry signal is at a logic high level. An interval between pulses of the carry clock signal generated during one frame period is the same, and at least two of intervals between pulses of the scan clock signal generated during the one frame period are different from each other.

23 Claims, 18 Drawing Sheets

(56) References Cited

U.S. PATENT DOCUMENTS

| | | | | |
|---|---|---|---|---|
| 11,574,598 | B2 * | 2/2023 | Chang | G09G 3/3266 |
| 2006/0256066 | A1 | 11/2006 | Moon | G09G 3/3688<br>345/100 |
| 2009/0051628 | A1 * | 2/2009 | Kwon | G09G 3/3233<br>345/77 |
| 2020/0007493 | A1 | 3/2020 | Ban et al. | |
| 2020/0074933 | A1 | 3/2020 | Ban | G09G 3/3283 |
| 2020/0349888 | A1 | 11/2020 | Park | G09G 3/3275 |
| 2020/0372851 | A1 | 11/2020 | Kim | G09G 3/2092 |
| 2020/0380911 | A1 * | 12/2020 | Park | G09G 3/32 |
| 2020/0410943 | A1 * | 12/2020 | Kim | G09G 3/3258 |
| 2021/0193021 | A1 | 6/2021 | Yang | G09G 3/3677 |

* cited by examiner

<DISPLAY PERIOD>

<THRESHOLD VOLTAGE SENSING PERIOD>

<THRESHOLD VOLTAGE SENSING PERIOD>

DISPLAY DEVICE

The application is a continuation of U.S. patent application Ser. No. 17/853,129, filed on Jun. 29, 2022, which claims priority to Korean Patent Application No. 10-2021-0178109, filed Dec. 13, 2021, and all the benefits accruing therefrom under 35 U.S.C. § 119, the content of which in its entirety is herein incorporated by reference.

BACKGROUND

Field

The present invention relates to a display device.

Discussion

With the development of information technology, the importance of a display device, which is a connection medium between users and information, has been emphasized. In response to this, the use of the display device such as a liquid crystal display device, an organic light emitting display device, a plasma display device, and the like has been increasing.

The display device may display a moving picture by continuously displaying a plurality of frames. In this case, each of the frames may include an image display period in which an image is displayed and a black display period in which the image is not displayed. Since each of the frames includes the black display period, it is possible to prevent the moving picture from being viewed with a delay. That is, motion picture response time ("MPRT") may be improved.

SUMMARY

However, when a conventional scan driver that sequentially applies scan signals to scan lines is used, there is a problem in that a frame period is doubled in order to alternately repeat the image display period and the black display period compared to a case where there is only the image display period.

A technical solution to the above problem, provided in the present application, is to provide a display device in which scan signals are sequentially applied to scan lines during an image display period and scan signals are simultaneously applied to scan lines during a black display period.

A display device according to an embodiment of the present invention includes: pixels connected to scan lines; and a scan driver, which supplies scan signals to the scan lines. The scan driver includes active stages having first output terminals connected to the scan lines, and each of the active stages includes a scan output circuit, which outputs a scan clock signal to a first output terminal when a voltage of a first active node is at a logic high level, and outputs a scan signal of a turn-off level to the first output terminal when a voltage of a second active node or a first carry signal is at a logic high level; and a carry output circuit, which outputs a carry clock signal to a second output terminal when the voltage of the first active node is at the logic high level, and, which outputs a carry signal of a turn-off level to the second output terminal when the voltage of the second active node or the first carry signal is at the logic high level. Intervals between pulses of the carry clock signal generated during one frame period are the same, and at least two of intervals between pulses of the scan clock signal generated during the one frame period are different from each other.

The scan output circuit may include a first transistor having a first electrode, which receives the scan clock signal, a gate electrode connected to the first active node, and a second electrode connected to the first output terminal; a first capacitor having a first electrode connected to the first active node and a second electrode connected to the first output terminal; a second transistor having a first electrode connected to the first output terminal, a gate electrode connected to the second active node, and a second electrode, which receives a first low voltage; and a third transistor having a first electrode connected to the first output terminal, a gate electrode, which receives the first carry signal, and a second electrode, which receives the first low voltage.

The carry output circuit may include a fourth transistor having a first electrode, which receives the carry clock signal, a gate electrode connected to the first active node, and a second electrode connected to the second output terminal; a second capacitor having a first electrode connected to the first active node and a second electrode connected to the second output terminal; a fifth transistor having a first electrode connected to the second output terminal, a gate electrode connected to the second active node, and a second electrode, which receives a second low voltage; and a sixth transistor having a first electrode connected to the second output terminal, a gate electrode, which receives the first carry signal, and a second electrode, which receives the second low voltage.

Each of the active stages may further include: an inverter, which charges the second active node with the voltage of the logic high level when the voltage of the first active node is at a logic low level and a first control signal is at a logic high level.

The inverter may include a seventh transistor having a first electrode and a gate electrode, which receives the first control signal, and a second electrode; an eighth transistor having a first electrode, which receives the first control signal, a gate electrode connected to the second electrode of the seventh transistor, and a second electrode connected to the second active node; a ninth transistor having a first electrode connected to the gate electrode of the eighth transistor, a gate electrode connected to the first active node, and a second electrode, which receives the first low voltage; and a tenth transistor having a first electrode connected to the second active node, a gate electrode connected to the first active node, and a second electrode, which receives the second low voltage.

Each of the active stages may further include a charging circuit, which charges the first active node with the voltage of the logic high level when a second carry signal is at a logic high level.

The charging circuit may include an eleventh transistor having a first electrode and a gate electrode, which receive the second carry signal, and a second electrode connected to the first active node.

Each of the active stages may further include a feedback circuit, which charges a third active node with the first control signal when the voltage of the first active node is at the logic high level.

The feedback circuit may include a twelfth transistor having a first electrode, which receives the first control signal, a gate electrode connected to the first active node, and a second electrode connected to the third active node.

Each of the active stages may further include a stabilization circuit, which applies the second low voltage to the first active node when the first carry signal or the voltage of the second active node is at the logic high level.

The stabilization circuit may include a thirteenth transistor having a first electrode connected to the first active node, a gate electrode, which receives the first carry signal, and a second electrode, which receives the second low voltage; and a fourteenth transistor having a first electrode connected to the first active node, a gate electrode connected to the second active node, and a second electrode, which receives the second low voltage.

Each of the active stages may further include an initialization circuit, which applies the second low voltage to the first active node when a second control signal is at a logic high level.

The initialization circuit may include a fifteenth transistor having a first electrode connected to the first active node, a gate electrode, which receives the second control signal, and a second electrode, which receives the second low voltage.

Each of the active stages may further include a sampling circuit, which samples the second carry signal when a third control signal is at a logic high level, and transmits the first control signal to the first active node when a sampled second carry signal and a fourth control signal are at a logic high level.

The sampling circuit may include a third capacitor having a first electrode, which receives the first control signal and a second electrode connected to a fourth active node; a sixteenth transistor having a first electrode, which receives the second carry signal, a gate electrode, which receives the third control signal, and a second electrode connected to the fourth active node; a seventeenth transistor having a first electrode, which receives the first control signal, a gate electrode connected to the fourth active node, and a second electrode; and an eighteenth transistor having a first electrode connected to the second electrode of the seventeenth transistor, a gate electrode, which receives the fourth control signal, and a second electrode connected to the first active node.

The sampling circuit may further include a nineteenth transistor having a first electrode connected to the second active node, a gate electrode connected to the fourth active node, and a second electrode; and a twentieth transistor having a first electrode connected to the second electrode of the nineteenth transistor, a gate electrode, which receives the fourth control signal, and a second electrode, which receives the second low voltage.

Each of the active stages may further include an additional scan output circuit, which outputs an additional scan clock signal to a third output terminal when the voltage of the first active node is at the logic high level, and, which outputs a scan signal of a turn-off level to the third output terminal when the voltage of the second active node or the first carry signal is at the logic high level.

The additional scan output circuit may include a twenty-first transistor having a first electrode, which receives the additional scan clock signal, a gate electrode connected to the first active node, and a second electrode connected to the third output terminal; a fourth capacitor having a first electrode connected to the first active node and a second electrode connected to the third output terminal; a twenty-second transistor having a first electrode connected to the third output terminal, a gate electrode connected to the second active node, and a second electrode, which receives the first low voltage; and a twenty-third transistor having a first electrode connected to the third output terminal, a gate electrode, which receives the first carry signal, and a second electrode, which receives the first low voltage.

The scan clock signal may sequentially include a first pulse, a second pulse, a third pulse, a fourth pulse, and a fifth pulse, and the carry clock signal may sequentially include a sixth pulse, a seventh pulse, an eighth pulse, a ninth pulse, and a tenth pulse. The first pulse and the sixth pulse may be generated at the same timing, the second pulse and the seventh pulse may be generated at the same timing, the third pulse and the eighth pulse may be generated at different timings from each other, the fourth pulse and the ninth pulse may be generated at different timings from each other, and the fifth pulse and the tenth pulse may be generated at the same timing.

A period from a time point at which the first pulse is generated to a time point at which the fifth pulse is generated may correspond to the one frame period.

The scan driver may further include: b front dummy stages and b back dummy stages, where b may be an integer greater than 0. First output terminals of the b front dummy stages and b back dummy stages may not be connected to the scan lines. Each of the active stages may supply the first carry signal to an active stage that is b stages ahead or a front dummy stage through the second output terminal, and supply the first carry signal to an active stage that is b stages behind or a back dummy stage through the second output terminal. Each of the front dummy stages may supply the first carry signal to the active stage that is b stages behind, and each of the back dummy stages may supply the first carry signal to the active stage that is b stages ahead.

The one frame period may include an image display period in which an image is displayed and a black display period in which the image is not displayed, the scan clock signal may include a first pulse and a second pulse during the image display period, and include a third pulse and a fourth pulse during the black display period, and each of widths of the first pulse and the second pulse may be greater than each of widths of the third pulse and the fourth pulse.

An interval between the first pulse and the second pulse may be different from an interval between the second pulse and the third pulse.

The scan driver may receive first scan clock signals and second scan clock signals, and the active stages may be divided into a plurality of groups. Each of the groups may include the same number of active stages as the number of the first scan clock signals, and the plurality of groups may alternately receive the first scan clock signals and the second scan clock signals in units of two groups.

The scan driver may receive first carry clock signals and second carry clock signals, and the plurality of groups may alternately receive the first carry clock signals and the second carry clock signals in units of two groups.

The one frame period may include an image display period in which an image is displayed and a black display period in which the image is not displayed, and a total number of the first scan clock signals may be 2n (n is an integer greater than 0). In the image display period, a first pulse of a first scan clock signal to an n-th pulse of the first scan clock signal may be sequentially generated at a first time interval, an (n+1)th pulse of the first scan clock signal may be generated after a second time interval from a time point at which the n-th pulse of the first scan clock signal is generated, and thereafter, an (n+2)th pulse of the first scan clock signal to a 2n-th pulse of the first scan clock signal may be sequentially generated at the first time interval between two adjacent pulses. The second time interval may be longer than the first time interval between two adjacent pulses.

In the black display period, pulses of the first scan clock signals may be generated simultaneously.

BRIEF DESCRIPTION OF THE DRAWINGS

The accompanying drawings, which are included to provide a further understanding of the present invention, and are incorporated in and constitute a part of this specification, illustrate exemplary embodiments of the present invention, and, together with the description, serve to explain principles of the present invention.

DETAILED DESCRIPTION

Figure 1:
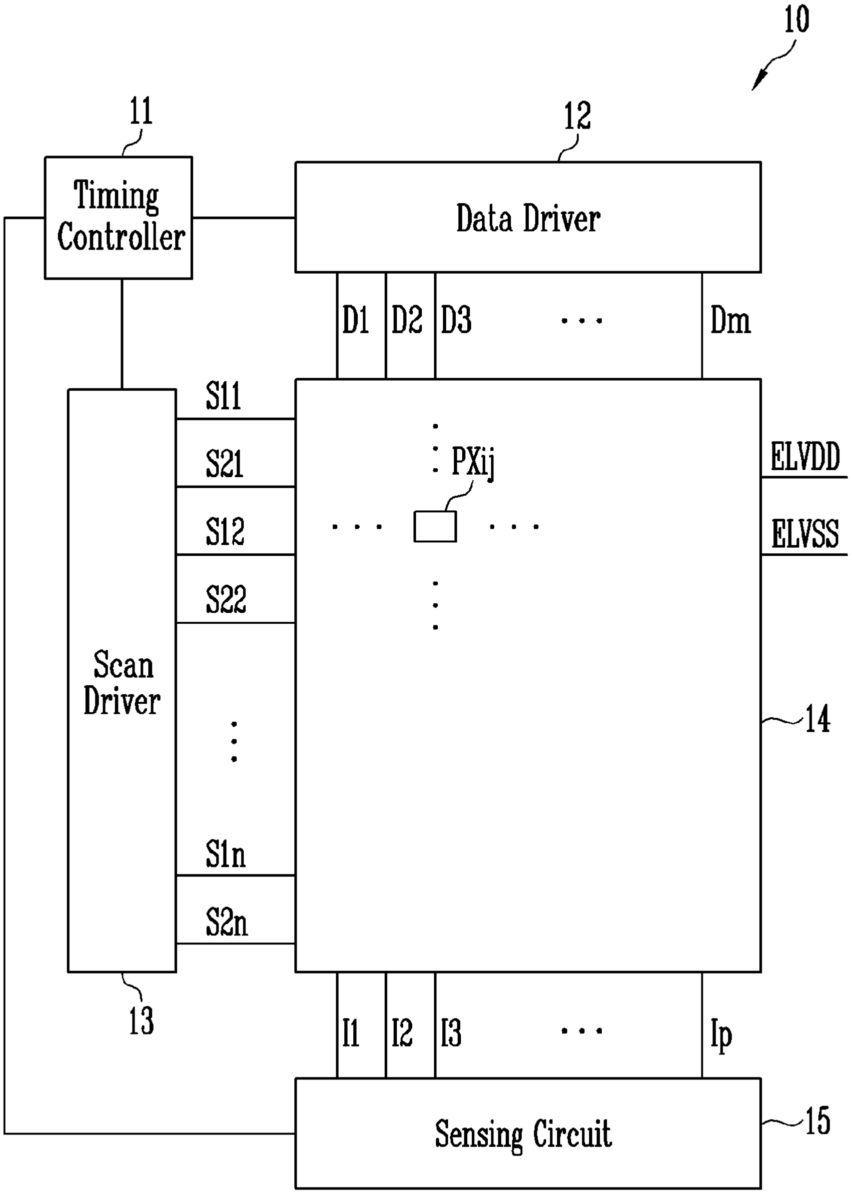
FIG. 1 is a diagram for explaining a display device according to an embodiment of the present invention.

Hereinafter, various embodiments of the present invention will be described in detail with reference to the accompanying drawings so that those of ordinary skill in the art may easily implement the present invention. The present invention may be embodied in various different forms and is not limited to the embodiments described herein.

In order to clearly describe the present invention, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present invention is not necessarily limited to those shown in the drawings. In the drawings, thicknesses may be exaggerated to clearly express the layers and regions.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In addition, in the description, the expression "is the same" may mean "substantially the same". That is, it may be the same enough to convince those of ordinary skill in the art to be the same. In other expressions, "substantially" may be omitted.

FIG. 1 is a diagram for explaining a display device according to an embodiment of the present invention.

Referring to FIG. 1, a display device 10 according to an embodiment of the present invention may include a timing controller 11, a data driver 12, a scan driver 13, a pixel circuit 14, and a sensing circuit 15.

The pixel circuit 14 may include pixels. Each pixel PXij may be connected to a corresponding data line, a corresponding scan line, and a corresponding sensing line. The pixels may be commonly connected to a first power source line ELVDD and a second power source line ELVSS. For example, during a display period, a voltage of the first power source line ELVDD may be greater than a voltage of the second power source line ELVSS.

In a sensing period, the data driver 12 may supply reference voltages to data lines connected to the pixels. In the sensing period, the sensing circuit 15 may receive sensing voltages from sensing lines connected to the pixels. The sensing circuit 15 may include sensing channels connected to sensing lines I1, I2, I3, . . . , and Ip. For example, the sensing lines I1 to Ip and the sensing channels may correspond one-to-one. For example, the number of sensing lines I1 to Ip may be the same as the number of sensing channels.

In the display period, the timing controller 11 may receive input grayscales and control signals for each image frame from a processor. The timing controller 11 may generate compensated grayscales by compensating the input grayscales for the pixels based on the sensing voltages. The timing controller 11 may provide the compensated grayscales to the data driver 12. Also, the timing controller 11 may provide control signals suitable for respective specifications to the data driver 12, the scan driver 13, and the sensing circuit 15.

During an image display period, the data driver 12 may generate data voltages to be provided to data lines D1, D2, D3, . . . , and Dm by using the compensated grayscales and the control signals received from the timing controller 11. For example, the data driver 12 may sample the compensated grayscales using a clock signal and apply data voltages corresponding to the compensated grayscales to the data lines D1 to Dm in circuits of pixel rows, where m may be an integer greater than 0. Here, a pixel row may mean pixels connected to the same scan line. During a black display period, the data driver 12 may generate data voltages of a black grayscale. For example, the data driver 12 may apply the data voltages corresponding to the black grayscale to the data lines D1 to Dm in circuits of pixel rows.

The scan driver 13 may receive clock signals and control signals from the timing controller 11 and generate first scan signals to be provided to first scan lines S11, S12, . . . , and S1*n* and second scan signals to be provided to second scan lines S21, S22, . . . , and S2*n*, where n may be an integer greater than 0. For example, during the image display period, the scan driver 13 may sequentially supply the first scan signals having a turn-on level pulse to the first scan lines S11 to S1*n*. Also, during the image display period, the scan driver 13 may sequentially supply the second scan signals having a turn-on level pulse to the second scan lines S21 to S2*n*. For example, during the black display period, the scan driver 13 may simultaneously supply the first scan signals having the turn-on level pulse to some of the first scan lines S11 to S1*n*. Also, during the black display period, the scan driver 13 may simultaneously supply the second scan signals having the turn-on level pulse to some of the second scan lines S21 to S2*n*.

In the display period, the sensing circuit 15 may receive a control signal from the timing controller 11 and supply an initialization voltage to the sensing lines I1 to Ip, where p may be an integer greater than 0.

Figure 2:
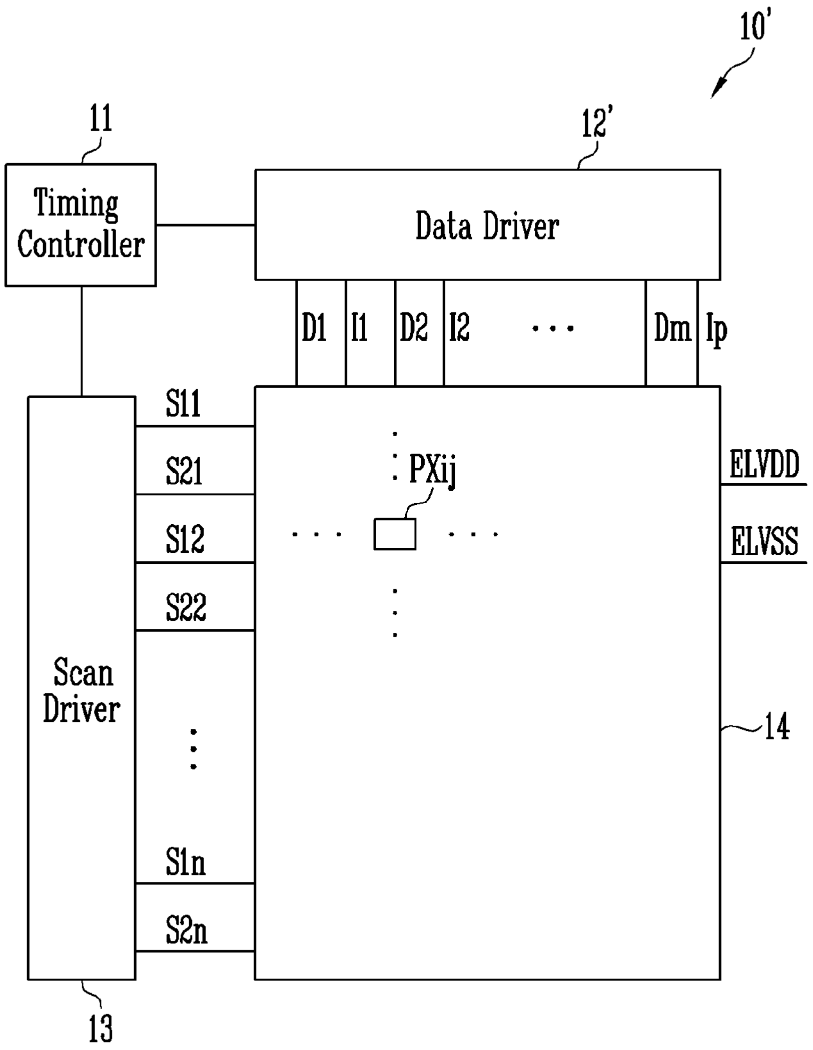
FIG. 2 is a diagram for explaining a display device according to another embodiment of the present invention.

FIG. 2 is a diagram for explaining a display device according to another embodiment of the present invention.

A display device 10' of FIG. 2 may include a timing controller 11, a data driver 12', a scan driver 13, and a pixel circuit 14.

The data driver 12' of the display device 10' of FIG. 2 may have a configuration in which the data driver 12 and the sensing circuit 15 of the display device 10 of FIG. 1 are integrated. That is, in the display device 10 of FIG. 1, the data driver 12 and the sensing circuit 15 may be configured as separate integrated circuit ("IC") chips, respectively. However, in the display device 10' of FIG. 2, the data driver 12' may be configured as a single IC chip. Accordingly, the data driver 12' may be connected to data lines D1 to Dm and sensing lines I1 to Ip.

Figure 3:
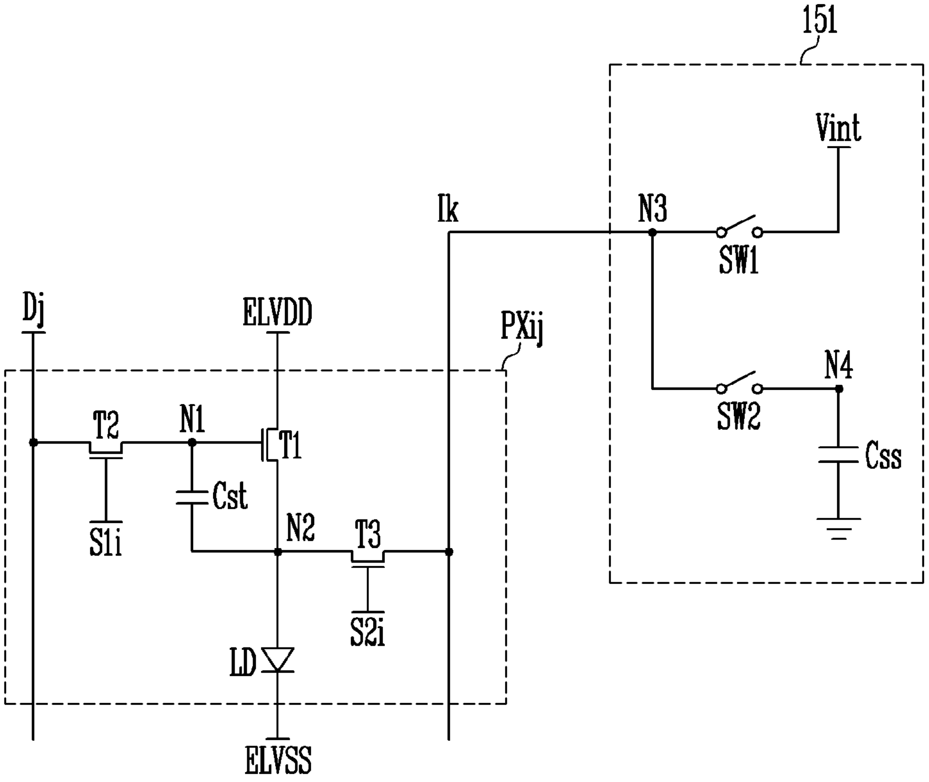
FIG. 3 is a diagram for explaining a pixel and a sensing channel according to an embodiment of the present invention.

FIG. 3 is a diagram for explaining a pixel and a sensing channel according to an embodiment of the present invention.

Referring to FIG. 3, an exemplary configuration of a pixel PXij and a sensing channel 151 will be described first.

The pixel PXij may include transistors T1, T2, and T3, a storage capacitor Cst, and a light emitting element LD.

The transistors T1, T2, and T3 may be configured as N-type transistors. In another embodiment, the transistors T1, T2, and T3 may be configured as P-type transistors. In another embodiment, the transistors T1, T2, and T3 may be configured as a combination of an N-type transistor and a P-type transistor. The P-type transistor may generally refer to a transistor in which the amount of current passed through increases when a voltage difference between a gate electrode and a source electrode increases in a negative direction. The N-type transistor may generally refer to a transistor in which the amount of current passed through increases when a voltage difference between a gate electrode and a source electrode increases in a positive direction. The transistors may be configured in various forms, such as thin film transistors ("TFTs"), field effect transistors ("FETs"), bipolar junction transistors ("BJTs"), and the like.

The transistor T1 may have a gate electrode connected to a first node N1, a first electrode connected to the first power source line ELVDD, and a second electrode connected to a second node N2. The transistor T1 may be referred to as a driving transistor.

The transistor T2 may have a gate electrode connected to a first scan line S1*i*, a first electrode connected to a data line Dj, and a second electrode connected to the first node N1. The transistor T2 may be referred to as a scan transistor.

The transistor T3 may have a gate electrode connected to a second scan line S2*i*, a first electrode connected to the second node N2, and a second electrode connected to a sensing line Ik. The transistor T3 may be referred to as a sensing transistor.

The storage capacitor Cst may have a first electrode connected to the first node N1 and a second electrode connected to the second node N2.

The light emitting element LD may have an anode connected to the second node N2 and a cathode connected to the second power source line ELVSS. The light emitting element LD may be a light emitting diode. The light emitting element LD may be composed of an organic light emitting diode, an inorganic light emitting diode, a quantum dot/well light emitting diode, or the like. In addition, although only one light emitting element LD is provided in each pixel in the present embodiment, a plurality of light emitting elements may be provided in each pixel in another embodiment. In this case, the plurality of light emitting elements may be connected in series, in parallel, or in series and parallel.

In general, the voltage of the first power source line ELVDD may be greater than the voltage of the second power source line ELVSS. However, in a special situation, such as preventing the light emitting element LD from emitting light, the voltage of the second power source line ELVSS may be set higher than the voltage of the first power source line ELVDD.

The sensing channel 151 may include a first switch SW1, a second switch SW2, and a sensing capacitor Css.

A first electrode of the first switch SW1 may be connected to a third node N3. For example, the third node N3 may correspond to the sensing line Ik. A second electrode of the first switch SW1 may receive an initialization voltage Vint. For example, the second electrode of the first switch SW1 may be connected to an initialization power source, which supplies the initialization voltage Vint.

A first electrode of the second switch SW2 may be connected to the third node N3, and a second electrode of the second switch SW2 may be connected to a fourth node N4.

The sensing capacitor Css may have a first electrode connected to the fourth node N4 and a second electrode connected to a reference power source (for example, a ground power source).

Although not shown, the sensing circuit 15 may include an analog-to-digital converter. For example, the sensing circuit 15 may include analog-to-digital converters corresponding to the number of sensing channels. The analog-to-digital converter may convert a sensing voltage stored in the sensing capacitor Css into a digital value. The converted digital value may be provided to the timing controller 11. In another example, the sensing circuit 15 may include a smaller number of analog-to-digital converters than the sensing channels, and may time-division and convert sensing signals stored in the sensing channels.

Figure 4:
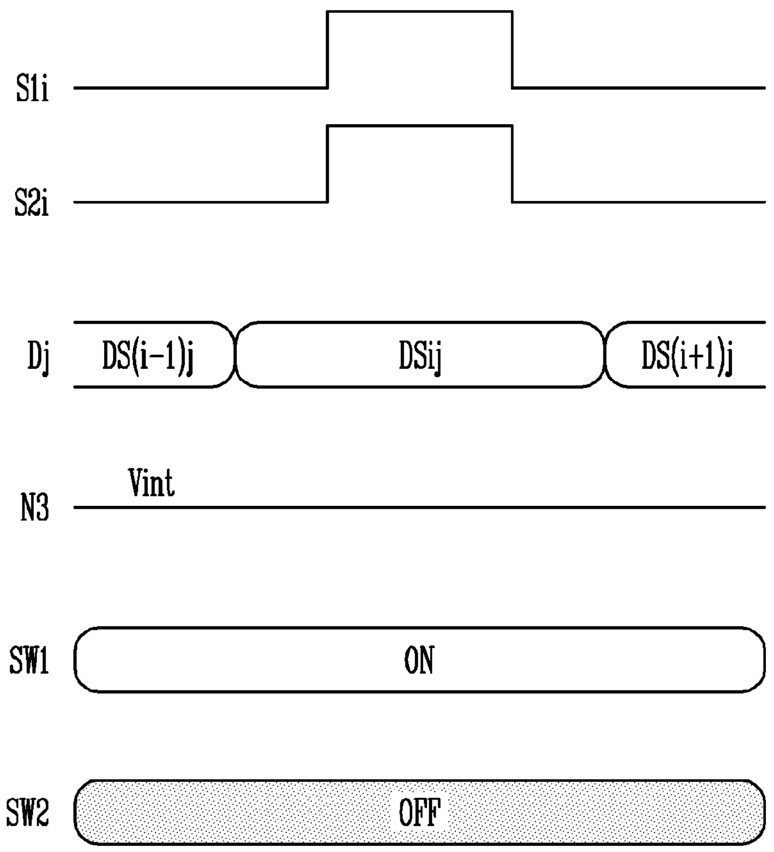
FIG. 4 is a diagram for explaining a display period according to an embodiment of the present invention.

FIG. 4 is a diagram for explaining a display period according to an embodiment of the present invention.

A display period of FIG. 4 may be the image display period or the black display period. Referring to FIG. 4, during the display period, the sensing line Ik, that is, the third node N3, may receive the initialization voltage VINT. During the display period, the first switch SW1 may be in a turned-on state, and the second switch SW2 may be in a turned-off state.

During the display period, data voltages DS(i−1)j, DSij, and DS(i+1)j may be sequentially applied to the data line Dj in units of horizontal periods. In a corresponding horizontal period, a first scan signal of a turn-on level (for example, a logic high level) may be applied to the first scan line S1*i*. Also, in synchronization with the first scan line S1*i*, a second scan signal of a turn-on level may be applied to the second scan line S2*i* as well.

For example, when scan signals of the turn-on level are applied to the first scan line S1*i* and the second scan line S2*i*, the transistor T2 and the transistor T3 may be turned on. Accordingly, a voltage corresponding to a difference between a data voltage DSij and the initialization voltage Vint may be written into the storage capacitor Cst of the pixel PXij.

In the pixel PXij, according to a voltage difference between the gate electrode and the source electrode of the transistor T1, the amount of a driving current flowing through a driving path connecting the first power source line ELVDD, the transistor T1, the light emitting element LD, and the second power source line ELVSS may be determined. The luminance of light emitted from the light emitting element LD may be determined according to the amount of the driving current.

Thereafter, when a scan signal of a turn-off level (for example, a logic low level) is applied to the first scan line S1*i* and the second scan line S2*i*, the transistor T2 and the transistor T3 may be turned off. Accordingly, regardless of a change in voltage on the data line Dj, the voltage difference between the gate electrode and the source electrode of the transistor T1 may be maintained by the storage capacitor Cst, and the luminance of light emitted from the light emitting element LD may be maintained.

Figure 5:
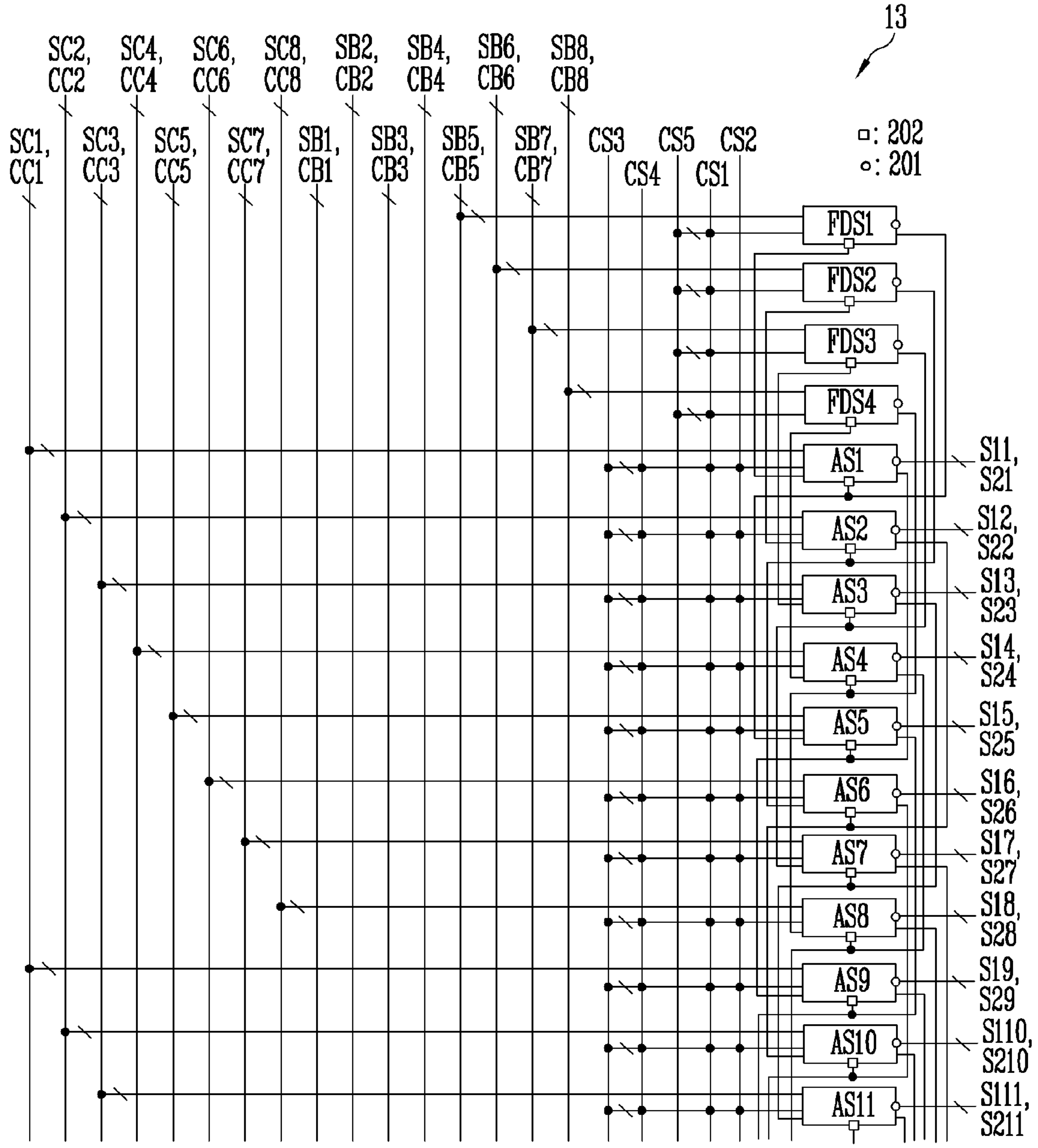
FIGS. 5 to 7 are diagrams for explaining a connection relationship between stages of a scan driver according to an embodiment of the present invention.
Figure 6:
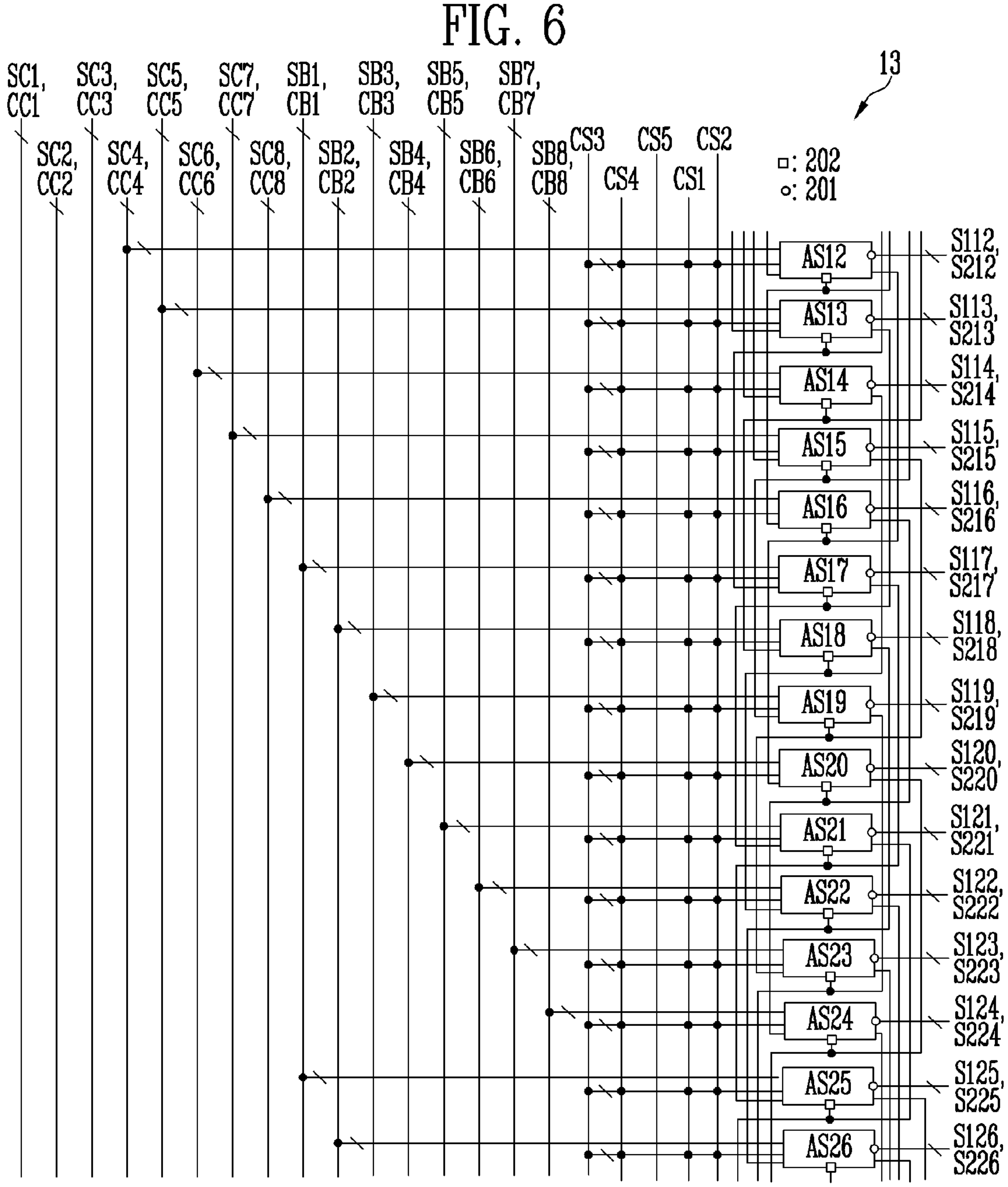
Figure 7:
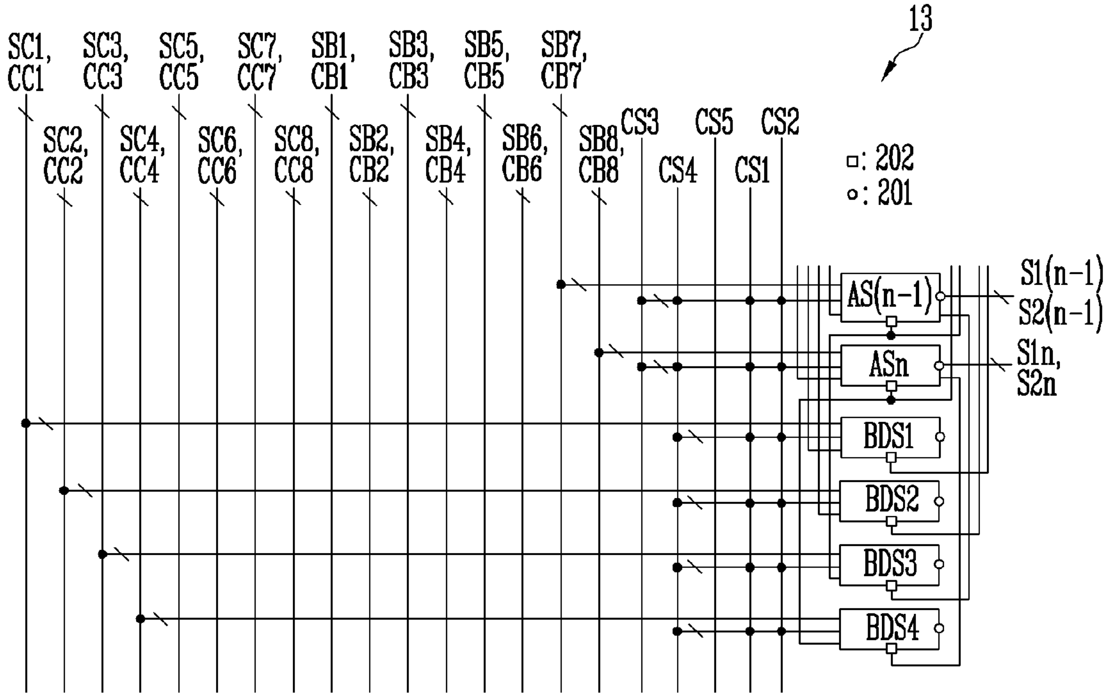

FIGS. 5 to 7 are diagrams for explaining a connection relationship between stages of a scan driver according to an embodiment of the present invention.

Referring to FIGS. 5 to 7, the scan driver 13 according to an embodiment of the present invention may include front dummy stages FDS1, FDS2, FDS3, and FDS4, active stages AS1, AS2, AS3, AS4, AS5, AS6, AS7, AS8, AS9, AS10, AS11, AS12, AS13, AS14, AS15, AS16, AS17, AS18, AS19, AS20, AS21, AS22, AS23, AS24, AS25, AS26, . . . , AS(n−1), and ASn, and back dummy stages BDS1, BDS2, BDS3, and BDS4.

First output terminals 201 of the active stages AS1 to ASn may be connected to scan lines S11 to S2*n*. For example, a first output terminal 201 of an active stage AS1 may be connected to a first scan line S11 and a second scan line S21. First output terminals 201 of the front dummy stages FDS1 to FDS4 may not be connected to the scan lines. Similarly, first output terminals 201 of the back dummy stages BDS1 to BDS4 may not be connected to the scan lines. That is, the active stages AS1 to ASn may be stages that supply the scan signals to the pixels, and the front dummy stages FDS1 to FDS4 and the back dummy stages BDS1 to BDS4 may be stages that do not supply the scan signals to the pixels. The front dummy stages FDS1 to FDS4 and the back dummy stages BDS1 to BDS4 may support the operation of the active stages AS1 to ASn by supplying carry signals to the active stages AS1 to ASn.

The front dummy stages FDS1 to FDS4, the active stages AS1 to ASn, and the back dummy stages BDS1 to BDS4 may include second output terminals 202. Each of the active stages AS1 to ASn may supply a carry signal to a previous b-th stage (i.e., stage that is b stages ahead) and a subsequent b-th stage (i.e., stage that is b stages behind) through a second output terminal 202, where b may be an integer greater than 0. Each of the front dummy stages FDS1 to FDS4 may supply a carry signal to a stage that is b stages behind. Each of the back dummy stages BDS1 to BDS4 may supply a carry signal to a stage that is b stages ahead. In this embodiment, it is assumed that b is 4, but b may be set to an appropriate integer such as 2 or 8 in another embodiment. For example, the second output terminal 202 of the active stage AS1 may be connected to a front dummy stage FDS1 and an active stage AS5, a second output terminal 202 of a front dummy stage FDS4 may be connected to an active stage AS4, and a second output terminal 202 of a back dummy stage BDS4 may be connected to an active stage ASn.

Each of the stages may be connected to corresponding scan clock lines, carry clock lines, and control lines. The front dummy stages FDS1 to FDS4 may receive a first control signal CS1 and a fifth control signal CS5. The active stages AS1 to ASn may receive the first control signal CS1, a second control signal CS2, a third control signal CS3, and a fourth control signal CS4. The back dummy stages BDS1 to BDS4 may receive the first control signal CS1, the second control signal CS2, and the fourth control signal CS4.

Figure 13:
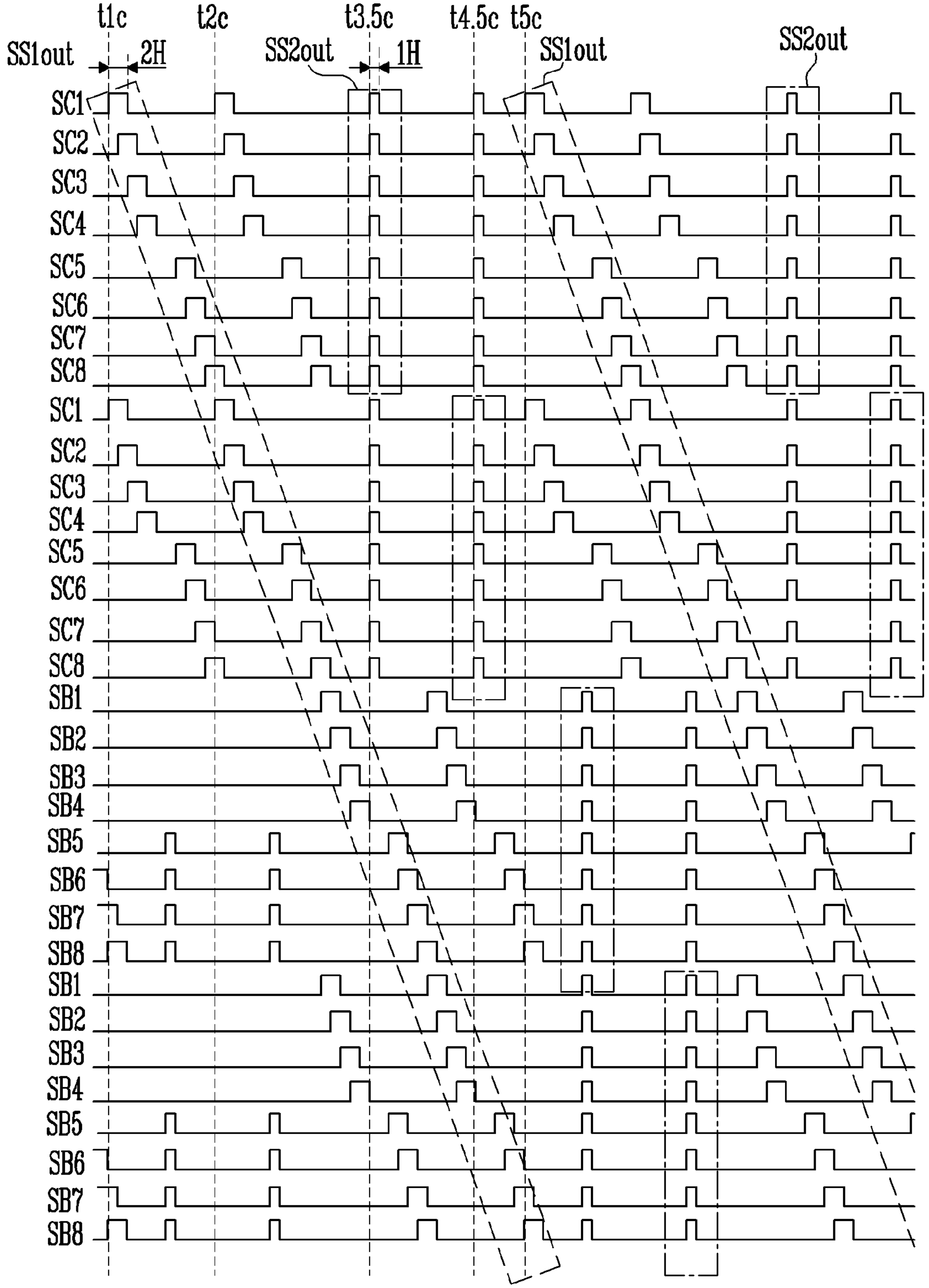

In the image display period, first scan clock signals SC1, SC2, SC3, SC4, SC5, SC6, SC7, and SC8 may have the same waveform, but may have different phases (refer to SS1out of FIG. 13). For example, a phase of a first scan clock signal SC2 may be delayed by one horizontal period 1H (See FIG. 13) from a phase of a first scan clock signal SC1. A phase of a first scan clock signal SC3 may be delayed by one horizontal period 1H from the phase of the first scan clock signal SC2. A phase of a first scan clock signal SC4 may be delayed by one horizontal period 1H from the phase of the first scan clock signal SC3. A phase of a first scan clock signal SC6 may be delayed by one horizontal period 1H from a phase of a first scan clock signal SC5. A phase of a first scan clock signal SC7 may be delayed by one horizontal period 1H from the phase of the first scan clock signal SC6. A phase of a first scan clock signal SC8 may be delayed by one horizontal period 1H from the phase of the first scan clock signal SC7.

However, in the image display period, the phase of the first scan clock signal SC5 may be delayed by a period greater than one horizontal period 1H from the phase of the first scan clock signal SC4. For example, the first scan clock signal SC4 of a turn-on level and the first scan clock signal SC5 of a turn-on level may include a gap period during which the first scan clock signal SC4 of a turn-on level and the first scan clock signal SC5 of a turn-on level do not overlap with each other. This gap period may be used as the black display period. In the black display period, first to eighth scan clock signals SC1 to SC8 may have the same waveform and phase (refer to SS2out of FIG. 13).

In the image display period, a second scan clock signal SB1 may have the same waveform as the first scan clock signal SC8, but a phase of the second scan clock signal SB1 may be delayed from the phase of the first scan clock signal SC8. For example, the phase of the second scan clock signal SB1 may be delayed by one horizontal period 1H from the phase of the first scan clock signal SC8.

Since the waveform and phase relationship between second scan clock signals SB1 to SB8 may be the same as the waveform and phase relationship between the first scan clock signals SC1 to SC8 described above, duplicate descriptions thereof will be omitted.

Figure 12:
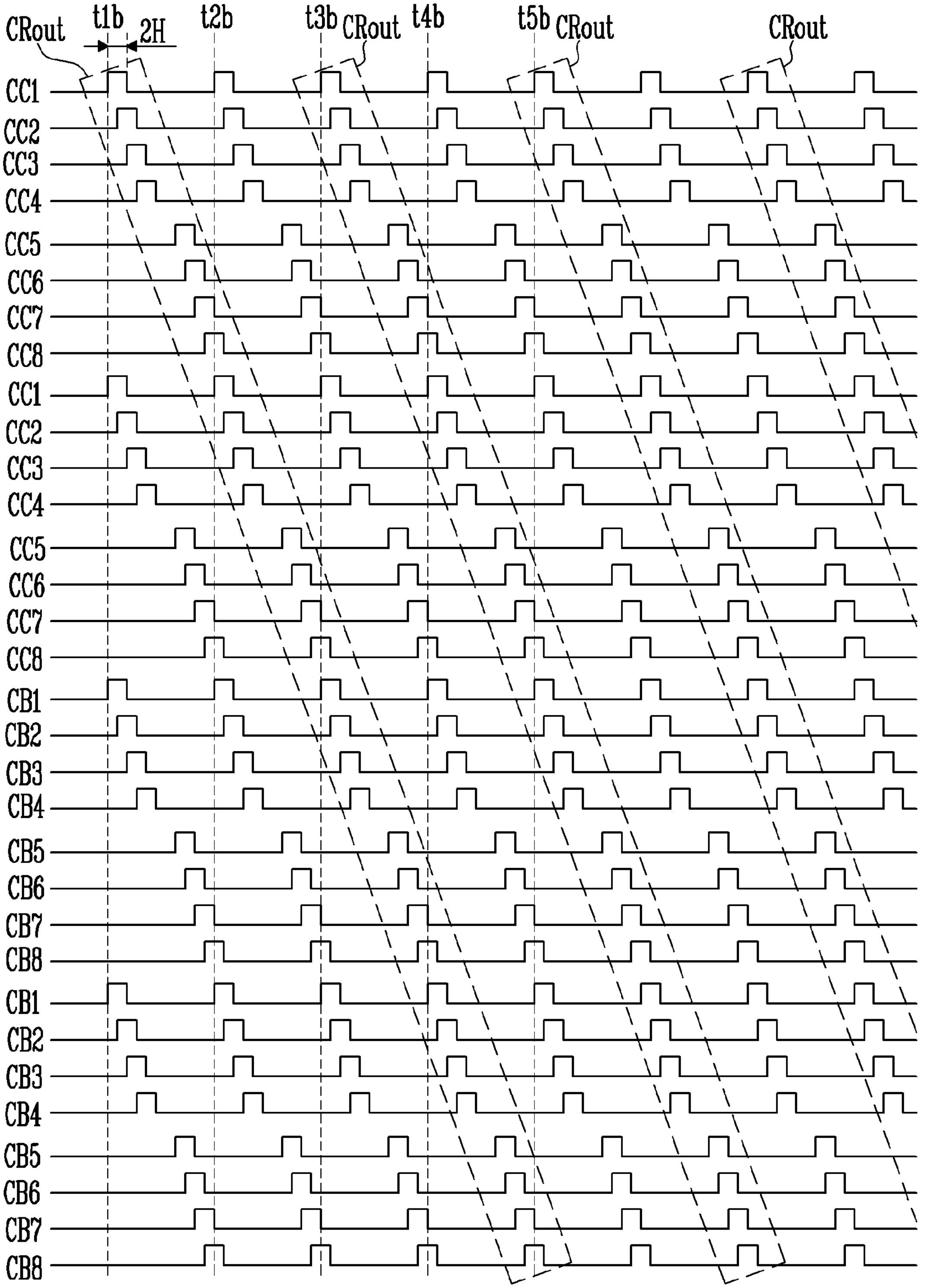

In both the image display period and the black display period, first carry clock signals CC1, CC2, CC3, CC4, CC5, CC6, CC7, and CC8 may have the same waveform, but may have different phases (refer to FIG. 12). For example, a phase of a first carry clock signal CC2 may be delayed by one horizontal period 1H from a phase of a first carry clock signal CC1. A phase of a first carry clock signal CC3 may be delayed by one horizontal period 1H from the phase of the first carry clock signal CC2. A phase of a first carry clock signal CC4 may be delayed by one horizontal period 1H from the phase of the first carry clock signal CC3. A phase of a first carry clock signal CC6 may be delayed by one horizontal period 1H from a phase of a first carry clock signal CC5. A phase of a first carry clock signal CC7 may be delayed by one horizontal period 1H from the phase of the first carry clock signal CC6. A phase of a first carry clock signal CC8 may be delayed by one horizontal period 1H from the phase of the first carry clock signal CC7.

However, the phase of the first carry clock signal CC5 may be delayed by a period greater than one horizontal period than the phase of the first carry clock signal CC4. For example, the first carry clock signal CC4 of a turn-on level and the first carry clock signal CC5 of a turn-on level may include a gap period during which the first carry clock signal CC4 of a turn-on level and the first carry clock signal CC5 of a turn-on level do not overlap with each other. This gap period may be set to match the timing with scan clock signals.

Since the waveform and phase relationship between second carry clock signals CB1 to CB8 may be the same as the waveform and phase relationship between the first carry clock signals CC1 to CC8 described above, duplicate descriptions thereof will be omitted. In an embodiment, the phase of the first carry clock signal CC1 and a phase of a second carry clock signal CB1 may be the same.

The front dummy stages FDS1 to FDS4 may receive second scan clock signals SB5 to SB8 and second carry clock signals CB5 to CB8, respectively.

The active stages AS1 to ASn may be divided into a plurality of groups. Each group may include the same number of stages (for example, 8) as the first scan clock signals SC1 to SC8. The plurality of groups may alternately receive the first scan clock signals SC1 to SC8 and the second scan clock signals SB1 to SB8 in units of two groups. For example, when a first group and a second group receive the first scan clock signals SC1 to SC8, respectively, a third group and a fourth group may receive the second scan clock signals SB1 to SB8, respectively. In this case, a fifth group and a sixth group may receive the first scan clock signals SC1 to SC8, respectively, and a seventh group and an eighth group receive the second scan clock signals SB1 to SB8, respectively.

The plurality of groups may alternately receive the first carry clock signals CC1 to CC8 and the second carry clock signals CB1 to CB8 in units of two groups. For example, when the first group and the second group receive the first carry clock signals CC1 to CC8, respectively, the third group and the fourth group may receive the second carry clock signals CB1 to CB8, respectively. In this case, the fifth group and the sixth group may receive the first carry clock signals CC1 to CC8, respectively, and the seventh group and the eighth group may receive the second carry clock signals CB1 to CB8, respectively.

For example, the first group of active stages AS1 to AS8 may receive the first scan clock signals SC1 to SC8 and the first carry clock signals CC1 to CC8, respectively. The second group of active stages AS9 to AS16 may receive the first scan clock signals SC1 to SC8 and the first carry clock signals CC1 to CC8, respectively. The third group of active stages AS17 to AS24 may receive the second scan clock signals SB1 to SB8 and the second carry clock signals CB1 to CB8, respectively. The fourth group of active stages AS25 to AS32 may receive the second scan clock signals SB1 to SB8 and the second carry clock signals CB1 to CB8, respectively.

The back dummy stages BDS1 to BDS4 may receive first scan clock signals SC1 to SC4 and first carry clock signals CC1 to CC4, respectively.

Figure 8:
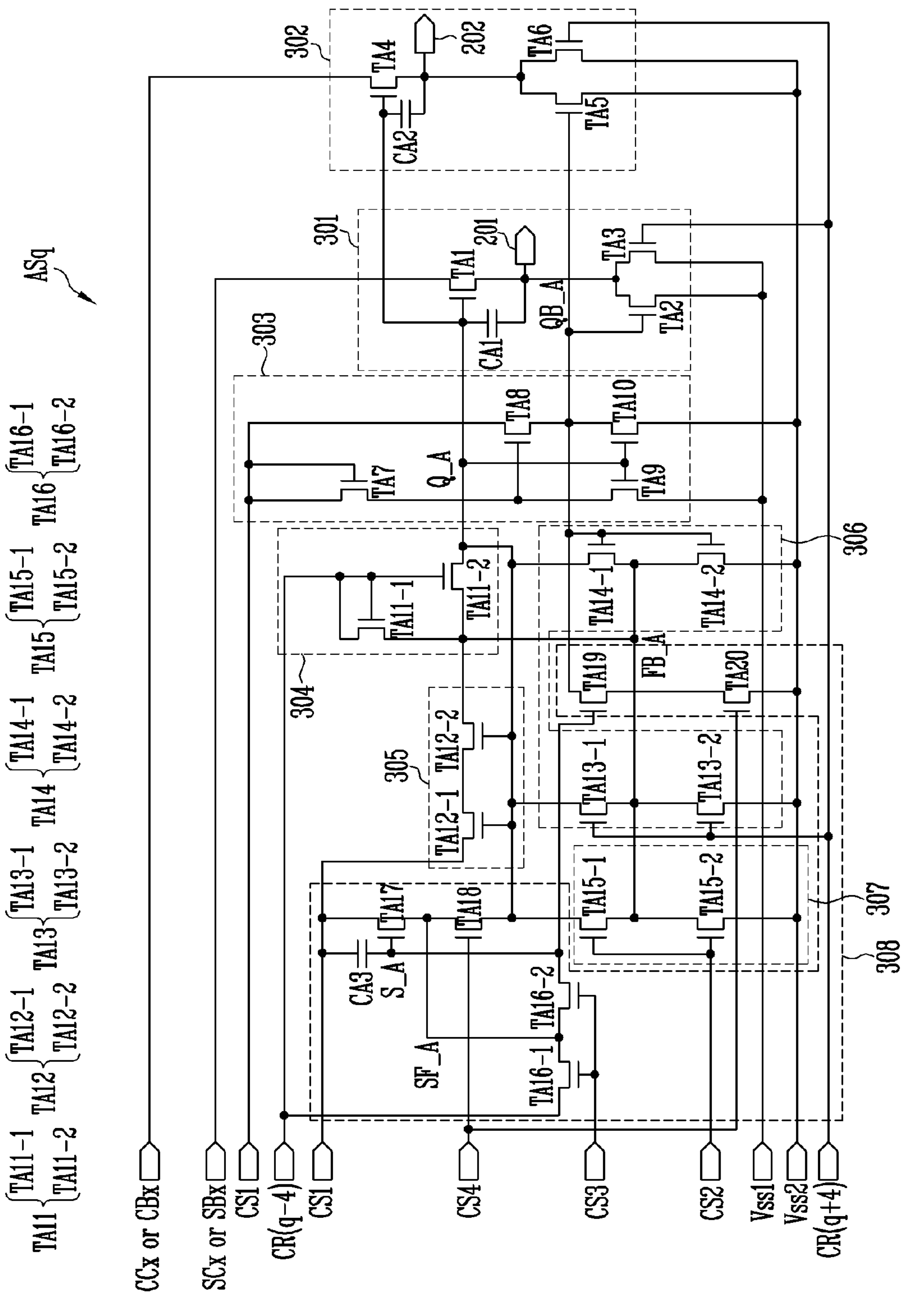
FIG. 8 is a diagram for explaining an active stage according to an embodiment of the present invention.

FIG. 8 is a diagram for explaining an active stage according to an embodiment of the present invention.

An active stage ASq according to an embodiment of the present invention may include a scan output circuit 301, a carry output circuit 302, an inverter 303, a charging circuit 304, a feedback circuit 305, a stabilization circuit 306, an initialization circuit 307, and a sampling circuit 308. Here, a q-th active stage ASq will be described as an example, where q may be an integer greater than or equal to 1 and less than or equal to n. Since other active stages may have the same configuration, duplicate descriptions thereof will be omitted. Hereinafter, transistors may be configured as N-type transistors.

The scan output circuit 301 may output a scan clock signal SCx or SBx to the first output terminal 201 when a voltage of a first active node Q_A is at a logic high level, and output the scan signal of the turn-off level to the first output terminal 201 when a voltage of a second active node QB_A or a first carry signal CR(q+4) is at a logic high level. As described with reference to FIGS. 5 to 7, the first output terminal 201 may be connected to a first scan line and a second scan line. Here, the scan clock signal SCx or SBx may mean one of the first scan clock signals SC1 to SC8 and the second scan clock signals SB1 to SB8. The first carry signal CR(q+4) may mean the carry signal output from the second output terminal 202 of a (q+4)th active stage (or back dummy stage).

The scan output circuit 301 may include first to third transistors TA1 to TA3 and a first capacitor CA1. The first transistor TA1 may have a first electrode, which receives the scan clock signal SCx or SBx, a gate electrode connected to the first active node Q_A, and a second electrode connected to the first output terminal 201. The first capacitor CA1 may have a first electrode connected to the first active node Q_A and a second electrode connected to the first output terminal 201. The second transistor TA2 may have a first electrode connected to the first output terminal 201, a gate electrode connected to the second active node QB_A, and a second electrode, which receives a first low voltage Vss1. The third transistor TA3 may have a first electrode connected to the first output terminal 201, a gate electrode, which receives the first carry signal CR(q+4), and a second electrode, which receives the first low voltage Vss1.

The carry output circuit 302 may output a carry clock signal CCx or CBx to the second output terminal 202 when the voltage of the first active node Q_A is at the logic high level, and output the carry signal of a turn-off level to the second output terminal 202 when the voltage of the second active node QB_A or the first carry signal CR(q+4) is at the logic high level. Here, the carry clock signal CCx or CBx may mean one of the first carry clock signals CC1 to CC8 or the second carry clock signals CB1 to CB8.

The carry output circuit 302 may include fourth to sixth transistors TA4 to TA6 and a second capacitor CA2. The fourth transistor TA4 may have a first electrode, which receives the carry clock signal CCx or CBx, a gate electrode connected to the first active node Q_A, and a second electrode connected to the second output terminal 202. The second capacitor CA2 may have a first electrode connected to the first active node Q_A and a second electrode connected to the second output terminal 202. The fifth transistor TA5 may have a first electrode connected to the second output terminal 202, a gate electrode connected to the second active node QB_A, and a second electrode, which receives a second low voltage Vss2. The sixth transistor TA6 may have a first electrode connected to the second output terminal 202, a gate electrode, which receives the first carry signal CR(q+4), and a second electrode, which receives the second low voltage Vss2.

The inverter 303 may charge the second active node QB_A with a voltage of the logic high level when the voltage of the first active node Q_A is at a logic low level and the first control signal CS1 is at a logic high level. The inverter 303 may perform a function of maintaining a logic level of the second active node QB_A to be opposite to a logic level of the first active node Q_A.

The inverter 303 may include seventh to tenth transistors TA7 to TA10. The seventh transistor TA7 may have a first electrode and a gate electrode, which receives the first control signal CS1, and a second electrode. The eighth transistor TA8 may have a first electrode, which receives the first control signal CS1, a gate electrode connected to the second electrode of the seventh transistor TA7, and a second electrode connected to the second active node QB_A. The ninth transistor TA9 may have a first electrode connected to the gate electrode of the eighth transistor TA8, a gate electrode connected to the first active node Q_A, and a second electrode, which receives the first low voltage Vss1. The tenth transistor TA10 may have a first electrode connected to the second active node QB_A, a gate electrode connected to the first active node Q_A, and a second electrode, which receives the second low voltage Vss2.

The charging circuit 304 may charge the first active node Q_A with a voltage of the logic high level when a second carry signal CR(q−4) is at a logic high level. The second carry signal CR(q−4) may mean the carry signal output from the second output terminal 202 of a (q−4)th active stage (or front dummy stage). The charging circuit 304 may pre-charge the first active node Q_A in response to the second carry signal CR(q−4). When the first active node Q_A is pre-charged, the first transistor TA1 may be turned on, so that the scan clock signal SCx or SBx of a turn-on level may be output to the first output terminal 201. Also, when the first active node Q_A is pre-charged, the fourth transistor TA4 may be turned on, so that the carry clock signal CCx or CBx of a turn-on level may be output to the second output terminal 202.

The charging circuit 304 may include an eleventh transistor TA11. The eleventh transistor TA11 may have a first electrode and a gate electrode, which receives the second carry signal CR(q−4), and a second electrode connected to the first active node Q_A. According to an embodiment, the eleventh transistor TA11 may include sub-transistors TA11-1 and TA11-2 connected in series.

The feedback circuit 305 may charge a third active node FB_A with the first control signal CS1 when the voltage of the first active node Q_A is at the logic high level.

The feedback circuit 305 may include a twelfth transistor TA12. The twelfth transistor TA12 may have a first electrode, which receives the first control signal CS1, a gate electrode connected to the first active node Q_A, and a second electrode connected to the third active node FB_A. The twelfth transistor TA12 may include sub-transistors TA12-1 and TA12-2 connected in series.

The stabilization circuit 306 may apply the second low voltage Vss2 to the first active node Q_A when the first carry signal CR(q+4) or the voltage of the second active node QB_A is at the logic high level. The stabilization circuit 306 may discharge the first active node Q_A in response to the first carry signal CR(q+4). Accordingly, it is possible to prevent the scan signal of the turn-on level or the carry signal from being output to the first output terminal 201 or the second output terminal 202.

The stabilization circuit 306 may include thirteenth and fourteenth transistors TA13 and TA14. The thirteenth transistor TA13 may have a first electrode connected to the first active node Q_A, a gate electrode, which receives the first carry signal CR(q+4), and a second electrode, which receives the second low voltage Vss2. The thirteenth transistor TA13 may include sub-transistors TA13-1 and TA13-2 connected in series. The fourteenth transistor TA14 may have a first electrode connected to the first active node Q_A, a gate electrode connected to the second active node QB_A, and a second electrode, which receives the second low voltage Vss2. The fourteenth transistor TA14 may include sub-transistors TA14-1 and TA14-2 connected in series.

The initialization circuit 307 may apply the second low voltage Vss2 to the first active node Q_A when the second control signal CS2 is at a logic high level.

The fifteenth transistor TA15 may have a first electrode connected to the first active node Q_A, a gate electrode, which receives the second control signal CS2, and a second electrode, which receives the second low voltage Vss2. The fifteenth transistor TA15 may include sub-transistors TA15-1 and TA15-2 connected in series.

The sampling circuit 308 may sample the second carry signal CR(q−4) when the third control signal CS3 is at a logic high level, and may transmit the first control signal CS1 to the first active node Q_A when the sampled second carry signal CR(q−4) and the fourth control signal CS4 are at a logic high level.

The sampling circuit 308 may include a third capacitor CA3 and sixteenth to twentieth transistors TA16 to TA20. The third capacitor CA3 may have a first electrode, which receives the first control signal CS1, and a second electrode connected to a fourth active node S_A. The sixteenth transistor TA16 may have a first electrode, which receives the second carry signal CR(q−4), a gate electrode, which receives the third control signal CS3, and a second electrode connected to the fourth active node S_A. The sixteenth transistor TA16 may include sub-transistors TA16-1 and TA16-2 connected in series. The seventeenth transistor TA17 may have a first electrode, which receives the first control signal CS1, a gate electrode connected to the fourth active node S_A, and a second electrode. The second electrode of the seventeenth transistor TA17 may be connected to a fifth active node SF_A that is a node between the sub-transistors TA16-1 and TA16-2. The eighteenth transistor TA18 may have a first electrode connected to the second electrode of the seventeenth transistor TA17, a gate electrode, which receives the fourth control signal CS4, and a second electrode connected to the first active node Q_A. The nineteenth transistor TA19 may have a first electrode connected to the second active node QB_A, a gate electrode connected to the fourth active node S_A, and a second electrode. The twentieth transistor TA20 may have a first electrode connected to the second electrode of the nineteenth transistor TA19, a gate electrode, which receives the fourth control signal CS4, and a second electrode, which receives the second low voltage Vss2.

For example, when sensing of a specific pixel row, by setting the third control signal CS3 to the logic high level when the second carry signal CR(q−4) is at the logic high level during the display period, the voltage of the logic high level may be stored in the fourth active node S_A through the sixteenth transistor TA16. Thereafter, when the fourth control signal CS4 is set to the logic high level during a non-display period (for example, a vertical blank period), the first active node Q_A may be charged with a voltage of the first control signal CS1 through the turned-on seventeenth and eighteenth transistors TA17 and TA18. Accordingly, the specific pixel row may be sensed by providing the scan clock signal SCx or SBx during the non-display period. The waveform and timing of the scan clock signal SCx or SBx may be the same as the waveform and timing of the scan signals applied to the first scan line S1*i* and the second scan line S2*i* shown in FIG. 15. The nineteenth and twentieth transistors TA19 and TA20 may supply the second low voltage Vss2 such that the second active node QB_A is maintained at a logic low level during the sensing period.

Figure 9:
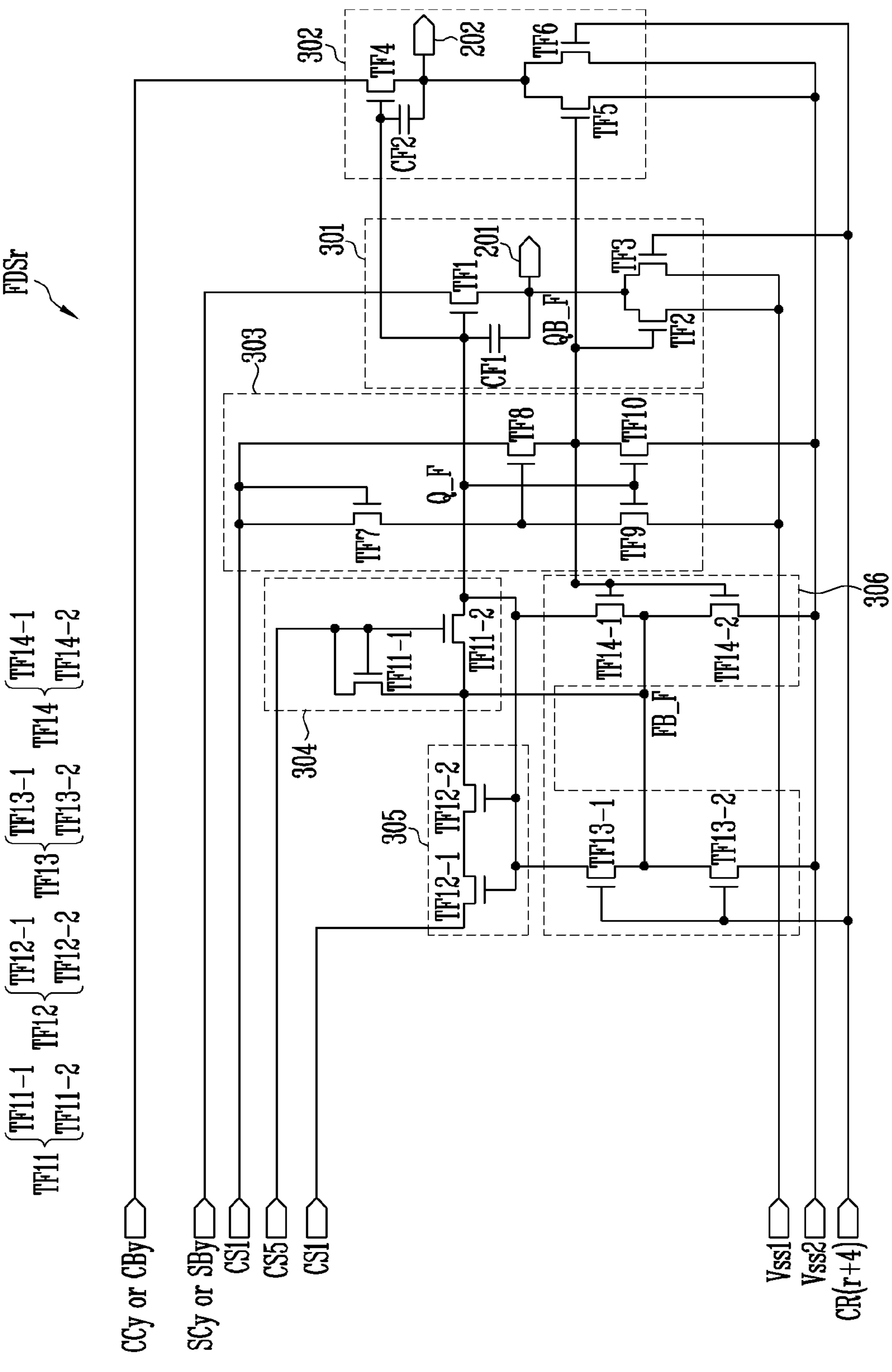
FIG. 9 is a diagram for explaining a front dummy stage according to an embodiment of the present invention.

FIG. 9 is a diagram for explaining a front dummy stage according to an embodiment of the present invention.

Referring to FIG. 19, a front dummy stage FDSr according to an embodiment of the present invention may include a scan output circuit 301, a carry output circuit 302, an inverter 303, a charging circuit 304, a feedback circuit 305, and a stabilization circuit 306. The front dummy stage FDSr may be different from the active stage ASq of FIG. 8 in that it does not include the initialization circuit 307 and the sampling circuit 308. Here, an r-th front dummy stage FDSr will be described as an example, where r may be an integer greater than or equal to 1. Since other front dummy stages may have the same configuration, duplicate descriptions thereof will be omitted. Hereinafter, transistors may be configured as N-type transistors.

The scan output circuit 301 may include first to third transistors TF1, TF2, and TF3 and a first capacitor CF1. Since the connection relationship between elements is the same as that of the scan output circuit 301 of the active stage ASq, duplicate descriptions thereof will be omitted.

The carry output circuit 302 may include fourth to sixth transistors TF4, TF5, and TF6 and a second capacitor CF2. Since the connection relationship between elements is the same as that of the carry output circuit 302 of the active stage ASq, duplicate descriptions thereof will be omitted.

The inverter 303 may include seventh to tenth transistors TF7, TF8, TF9, and TF10. Since the connection relationship between elements is the same as that of the inverter 303 of the active stage ASq, duplicate descriptions thereof will be omitted.

The charging circuit 304 may include an eleventh transistor TF11. The eleventh transistor TF11 may be different from the eleventh transistor TA11 of the active stage ASq in that a first electrode receives the fifth control signal CS5. Since front dummy stages do not receive a second carry signal from previous stages, the fifth control signal CS5 may be used as a scan start signal.

The feedback circuit 305 may include a twelfth transistor TF12. Since the connection relationship between elements is the same as that of the feedback circuit 305 of the active stage ASq, duplicate descriptions thereof will be omitted.

The stabilization circuit 306 may include thirteenth and fourteenth transistors TF13 and TF14. Since the connection relationship between elements is the same as that of the stabilization circuit 306 of the active stage ASq, duplicate descriptions thereof will be omitted.

Figure 10:
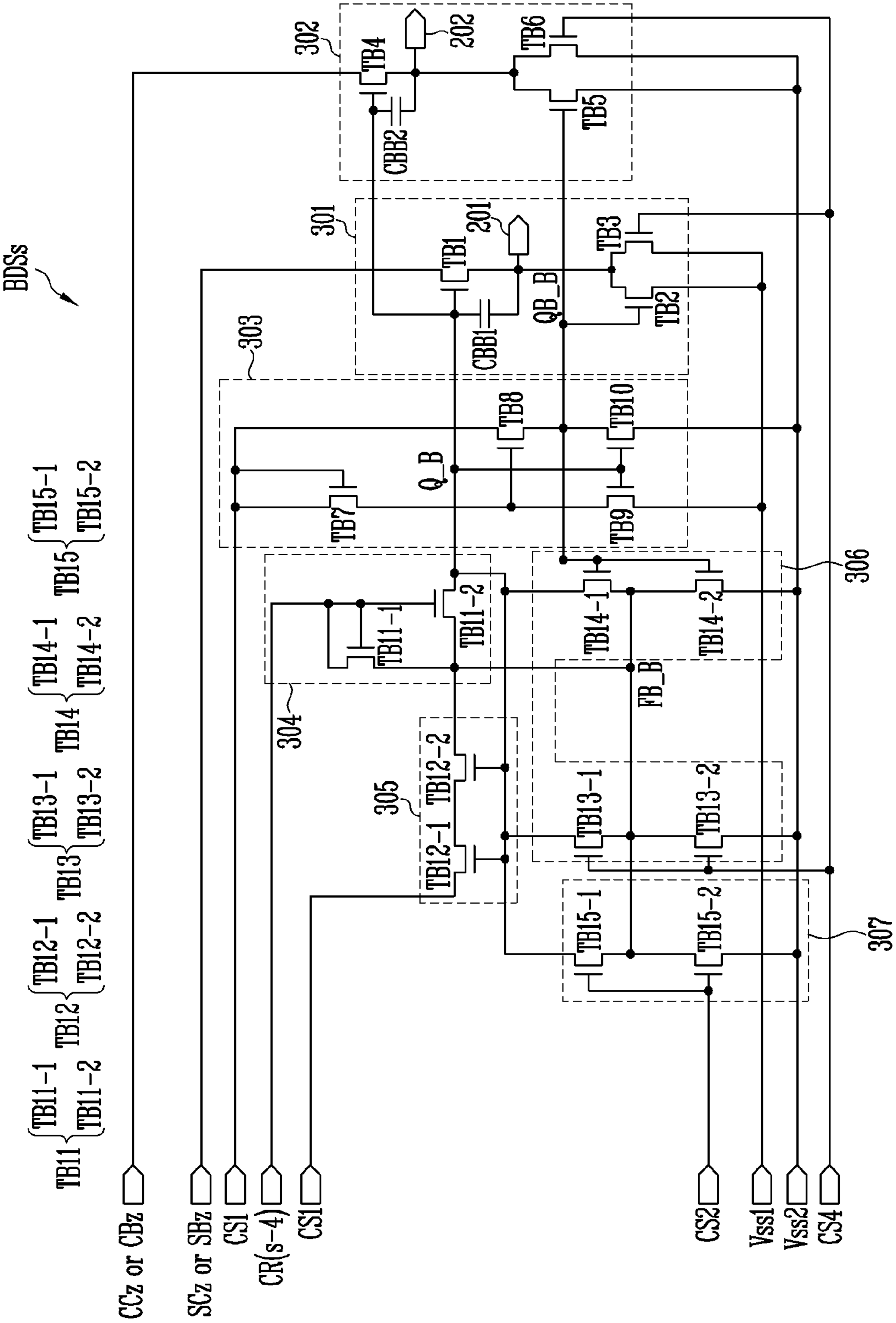
FIG. 10 is a diagram for explaining a back dummy stage according to an embodiment of the present invention.

FIG. 10 is a diagram for explaining a back dummy stage according to an embodiment of the present invention.

Referring to FIG. 10, a back dummy stage BDSs according to an embodiment of the present invention may include a scan output circuit 301, a carry output circuit 302, an inverter 303, a charging circuit 304, a feedback circuit 305, a stabilization circuit 306, and an initialization circuit 307. The back dummy stage BDSs may be different from the active stage ASq of FIG. 8 in that it does not include the sampling circuit 308. Here, a s-th back dummy stage BDSs will be described as an example, where s may be an integer greater than or equal to 1. Since other back dummy stages may have the same configuration, duplicate descriptions thereof will be omitted. Hereinafter, transistors may be configured as N-type transistors.

The scan output circuit 301 may include first to third transistors TB1, TB2, and TB3 and a first capacitor CBB1. The third transistor TB3 may be different from the third transistor TA3 of the active stage ASq in that a gate electrode receives the fourth control signal CS4. Since back dummy stages do not receive a first carry signal from subsequent stages, the fourth control signal CS4 may be used instead of the first carry signal.

The carry output circuit 302 may include fourth to sixth transistors TB4, TB5, and TB6 and a second capacitor CBB2. The sixth transistor TB6 may be different from the sixth transistor TA6 of the active stage ASq in that a gate electrode receives the fourth control signal CS4. Since back dummy stages do not receive a first carry signal from subsequent stages, the fourth control signal CS4 may be used instead of the first carry signal.

The inverter 303 may include seventh to tenth transistors TB7, TB8, TB9, and TB10. Since the connection relationship between elements is the same as that of the inverter 303 of the active stage ASq, duplicate descriptions thereof will be omitted.

The charging circuit 304 may include an eleventh transistor TB11. Since the connection relationship between elements is the same as that of the charging circuit 304 of the active stage ASq, duplicate descriptions thereof will be omitted.

The feedback circuit 305 may include a twelfth transistor TB12. Since the connection relationship between elements is the same as that of the feedback circuit 305 of the active stage ASq, duplicate descriptions thereof will be omitted.

The stabilization circuit 306 may include thirteenth and fourteenth transistors TB13 and TB14. The thirteenth transistor TB13 may be different from the thirteenth transistor TA13 of the active stage ASq in that a gate electrode receives the fourth control signal CS4. Since back dummy stages do not receive a first carry signal from subsequent stages, the fourth control signal CS4 may be used instead of the first carry signal.

The initialization circuit 307 may include a fifteenth transistor TB15. Since the connection relationship between elements is the same as that of the initialization circuit 307 of the active stage ASq, duplicate descriptions thereof will be omitted.

FIGS. 11 to 14 are diagrams for explaining a method of driving a scan driver according to an embodiment of the present invention.

Figure 11:
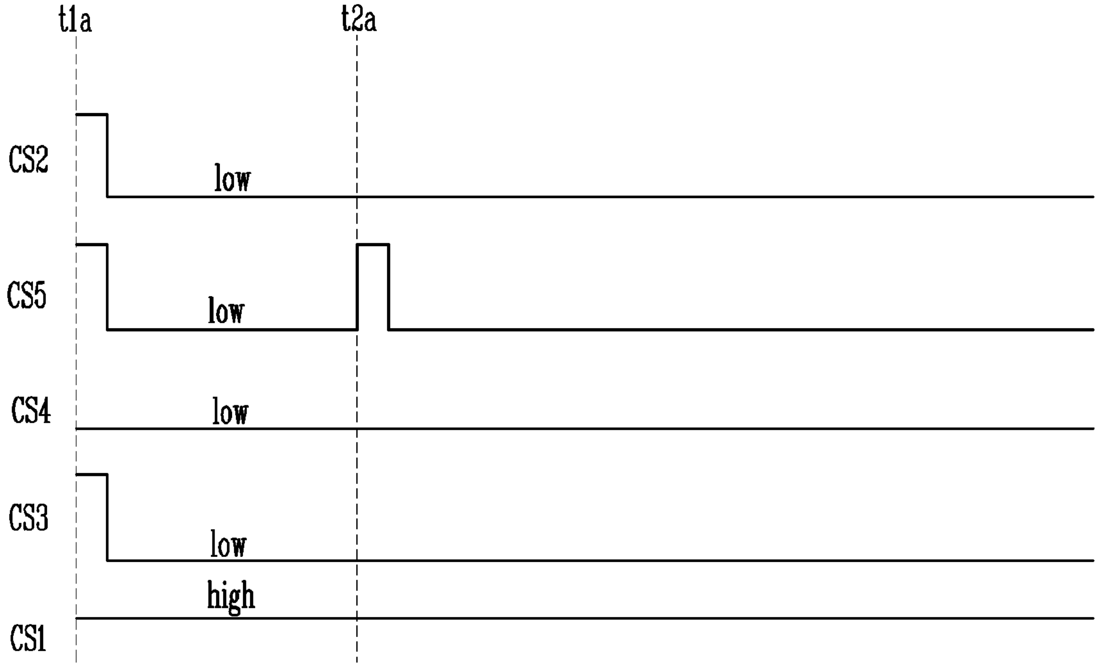
FIGS. 11 to 14 are diagrams for explaining a method of driving a scan driver according to an embodiment of the present invention.

Referring to FIG. 11, at a time point t1*a*, the second control signal CS2, the third control signal CS3, and the fifth control signal CS5 may be set to the logic high level. The first active node Q_A of the active stages and a first back dummy node Q_B of the back dummy stages may be discharged to the second low voltage Vss2 by the second control signal CS2 of the logic high level. Also, the fourth active node S_A of the active stages may be discharged to the logic low level by the third control signal CS3 of the logic high level.

Also, a first front dummy node Q_F of the front dummy stages may be pre-charged by the fifth control signal CS5 of the logic high level. Thereafter, the front dummy stages may sequentially output the carry signals to the second output terminals 202 in response to the timing at which the carry clock signal CCy or CBy is set to the logic high level. The fifth control signal CS5 of the logic high level at the time point t1*a* may be referred to as a first scan start signal. The first scan start signal may be a start signal for sequentially supplying scan signals having the turn-on level pulse in the image display period.

At a time point t2*a*, the fifth control signal CS5 may be set to the logic high level. The first front dummy node Q_F of the front dummy stages may be pre-charged by the fifth control signal CS5 of the logic high level. Thereafter, the front dummy stages sequentially output the carry signals to the second output terminals 202 in response to the timing at which the carry clock signal CCy or CBy is set to the logic high level. The fifth control signal CS5 of the logic high level at the time point t2*a* may be referred to as a second scan start signal. The second scan start signal may be a start signal for simultaneously supplying scan signals having the turn-on level pulse in the black display period.

Referring to FIG. 12, timings of carry clock signals CC1 to CC8, CC1 to CC8, CB1 to CB8, and CB1 to CB8 received in a first active stage AS1 to a thirty-second active stage are shown (refer to FIGS. 5 to 7). For example, turn-on level pulses of the carry clock signals CC1 to CC8 and CB1 to CB8 may be set to two horizontal periods 2H.

Not all of the carry clock signals CC1 to CC8 and CB1 to CB8 input to each of the stages are output to the second output terminal 202. The carry clock signals CC1 to CC8 and CB1 to CB8 may be output to the second output terminal 202 only when the first node Q_A, Q_F, or Q_B of the corresponding stage is pre-charged to the logic high level at a time point at which the carry clock signals CC1 to CC8 and CB1 to CB8 are input.

It is assumed that the first active stage AS1 outputs a carry signal of a turn-on level at a time point t1*b* in response to the first scan start signal in a first frame period t1*b* to t5*b*. Also, it is assumed that the first active stage AS1 outputs a carry signal of a turn-on level at a time point t3*b* in response to the second scan start signal in the first frame period t1*b* to t5*b*. Also, it is assumed that the first active stage AS1 outputs a carry signal of a turn-on level at a time point t5*b* in response to the first scan start signal in a second frame period t5*b*~. In this case, only carry clock signals CRout of a turn-on level indicated by the dotted line may be output to the second output terminal 202, and carry clock signals of a turn-on level outside the dotted line may not be output to the second output terminal 202.

Referring to FIG. 13, timings of scan clock signals SC1 to SC8, SC1 to SC8, SB1 to SB8, and SB1 to SB8 received in the first active stage AS1 to the thirty-second active stage are shown (refer to FIGS. 5 to 7). For example, turn-on level pulses of the scan clock signals SC1 to SC8 and SB1 to SB8 for sequential driving may be set to two horizontal periods 2H. Turn-on level pulses of the scan clock signals SC1 to SC8 and SB1 to SB8 for simultaneous driving may be set to one horizontal period 1H.

Not all of the scan clock signals SC1 to SC8 and SB1 to SB8 input to each of the stages are output to the first output terminal 201. The scan clock signals SC1 to SC8 and SB1 to SB8 may be output to the first output terminal 201 only when the first active node Q_A of the corresponding stage is pre-charged to the logic high level at a time point at which the scan clock signals SC1 to SC8 and SB1 to SB8 are input.

It is assumed that the first active stage AS1 outputs a scan signal of the turn-on level at a time point t1*c* in response to the first scan start signal of a first frame period t1*c* to t5*c*. Also, it is assumed that the first active stage AS1 outputs a scan signal of the turn-on level at a time point t3.5*c* in response to the second scan start signal of the first frame period t1*c* to t5*c*. Also, it is assumed that the first active stage AS1 outputs a scan signal of the turn-on level at a time point t5*c* in response to the first scan start signal of a second frame period t5*c*~. In this case, only scan clock signals SS1out and SS2out of a turn-on level indicated by the dotted line may be output to the first output terminal 201, and scan clock signals of the turn-on level outside the dotted line may not be output to the first output terminal 201.

The data driver 12 may apply data voltages for displaying an image to the data lines D1 to Dm at timings corresponding to the scan signals based on scan clock signals SS1out of the turn-on level.

The data driver 12 may apply data voltages (for example, corresponding to black grayscales) for displaying black to the data lines D1 to Dm at timings corresponding to the scan signals based on scan clock signals SS2out of the turn-on level.

The time point t1*b* of FIG. 12 and the time point t1*c* of FIG. 13 may be the same time point. A time point t2*b* of FIG. 12 and a time point t2*c* of FIG. 13 may be the same time point. The time point t3*b* of FIG. 12 may be a time point prior to the time point t3.5*c* of FIG. 13. A time point t4*b* of FIG. 12 may be a time point prior to a time point t4.5*c* of FIG. 13. The time point t5*b* of FIG. 12 and the time point t5*c* of FIG. 13 may be the same time point.

Accordingly, the scan clock signal SC1 may sequentially include a first pulse, a second pulse, a third pulse, a fourth pulse, and a fifth pulse at each of time points t1*c*, t2*c*, t3.5*c*, t4.5*c*, and t5*c*. The carry clock signal CC1 may sequentially include a sixth pulse, a seventh pulse, an eighth pulse, a ninth pulse, and a tenth pulse at each of time points t1*b*, t2*b*, t3*b*, t4*b*, and t5*b*. The first pulse and the sixth pulse may be generated at the same timing t1*c* and t1*b*. The second pulse and the seventh pulse may be generated at the same timing t2*c* and t2*b*. The third pulse and the eighth pulse may be generated at different timings t3.5*c* and t3*b*. The fourth pulse and the ninth pulse may be generated at different timings t4.5*c* and t4*b*. The fifth pulse and the tenth pulse may be generated at the same timing t5*c* and t5*b*.

A period from the time point t1*c*, at which the first pulse is generated, to the time point t5*c*, at which the fifth pulse is generated, may correspond to one frame period. That is, if the pixels, which receives the first scan signal and the second scan signal, store a data voltage corresponding to a first frame at the time point t1*c*, the corresponding pixels may store a data voltage corresponding to a second frame at the time point t5*c*. Referring to FIG. 12, an interval between pulses of the first carry clock signal CC1 generated during one frame period t1*b* to t5*b* may be constant (i.e., the same). For example, an interval between adjacent pulses of the first carry clock signal CC1 may correspond to 10 horizontal periods (i.e., 10H). In an example of FIG. 12, since a total number of the first carry clock signals CC1 to CC8 is 8, at least 8 horizontal periods may be desirable, and at least two horizontal periods may be desirable for the insertion of the black display period between a pulse of the first carry clock signal CC4 and a pulse of the first carry clock signal CC5. Referring to FIG. 13, the same description may be applied to pulses generated at adjacent time points t1*c* and t2*c* of the first scan clock signal SC1. However, in the first scan clock signal SC1, at least two of intervals between pulses generated during one frame period t1*c* to t5*c* may be different from each other. For example, an interval between time points t1*c* and t2*c* and an interval between time points t2*c* and t3.5*c* may be different from each other.

Referring to FIG. 13, during one frame period t1*c* to t5*c*, the first scan clock signal SC1 may include two pulses for displaying an image t1*b* and t2*b* and may include two pulses for displaying black t3.5*c* and t4.5*c*.

As described above, one frame period t1*c* to t5*c* may include an image display period t1*c* to t3.5*c* in which an image is displayed and a black display period t3.5*c* to t5*c* in which the image is not displayed. It is assumed that there are 2n first scan clock signals SC1 to SC8, where n may be an integer greater than 0. For example, in FIG. 13, n may be 4. In the image display period t1*c* to t3.5*c*, a first pulse of the first scan clock signal SC1 to an n-th pulse of the first scan clock signal SC4 may be sequentially generated at a first time interval (for example, 1 horizontal period), an (n+1)th pulse of the first scan clock signal SC5 may be generated after a second time interval (for example, 3 horizontal period) from a time point at which the n-th pulse of the first scan clock signal SC4 is generated, and thereafter, an (n+2)th pulse of the first scan clock signal SC6 to a 2n-th pulse of the first scan clock signal SC8 may be sequentially generated at the first time interval (for example, 1 horizontal period). The second time interval may be longer than the first time interval. In the black display period t3.5*c* to t5*c*, pulses of the first scan clock signals SC1 to SC8 may be simultaneously generated. This description may be equally applicable to the second scan clock signals SB1 to SB8.

Figure 14:
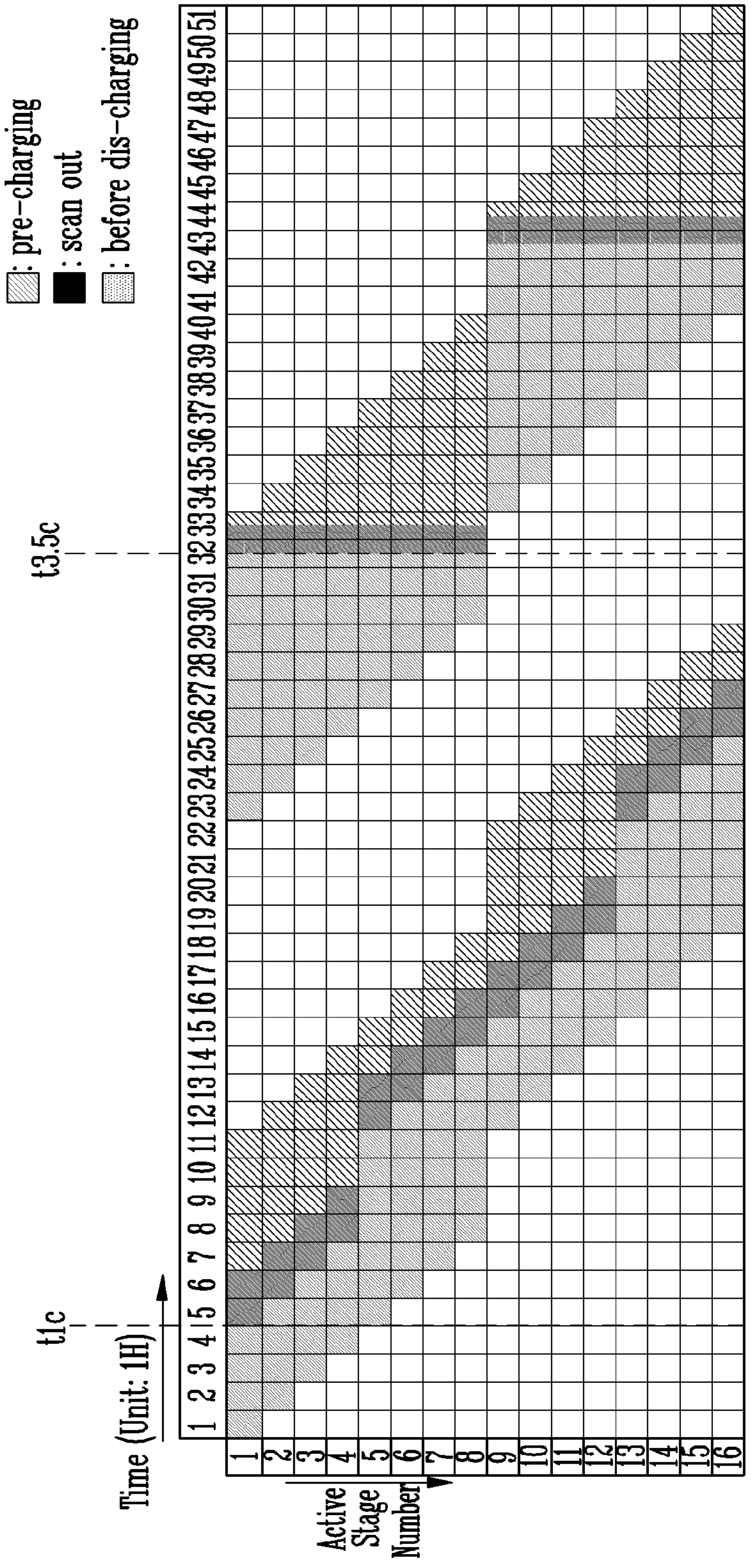

Referring to FIG. 14, for better understanding, from the first active stage AS1 to a sixteenth active stage AS16, a pre-charge time point, a turn-on level scan signal output time point, and a discharge time point are exemplarily shown in units of one horizontal period 1H.

Figure 15:
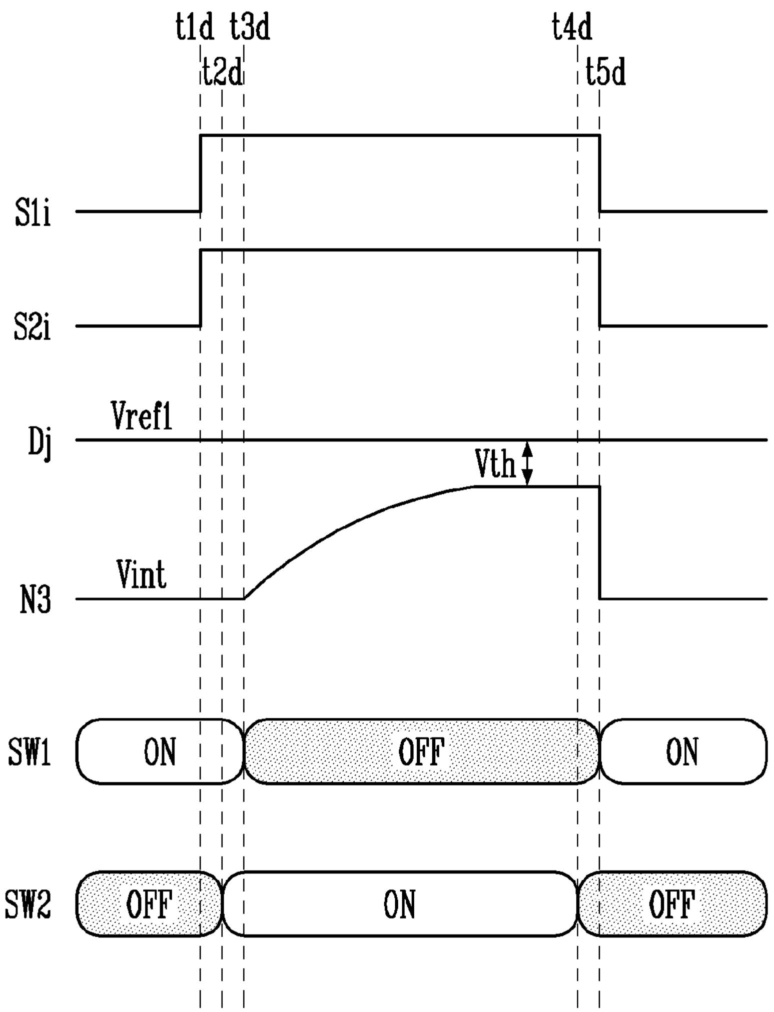
FIG. 15 is a diagram for explaining a threshold voltage sensing period of a transistor according to an embodiment of the present invention.

FIG. 15 is a diagram for explaining a threshold voltage sensing period of a transistor according to an embodiment of the present invention.

Before a time point t1*d*, the first switch SW1 may be in the turned-on state, and the second switch SW2 may be in the turned-off state. Accordingly, the initialization voltage Vint may be applied to the third node N3. Also, the data driver 12 may supply a reference voltage Vref1 to the data line Dj.

At the time point t1*d*, a first scan signal of a turn-on level may be supplied to the first scan line S1*i*, and a second scan signal of a turn-on level may be supplied to the second scan line S2*i*. Accordingly, the reference voltage Vref1 may be applied to the first node N1, and the initialization voltage Vint may be applied to the second node N2. Accordingly, the transistor T1 may be turned on according to a difference between a gate voltage and a source voltage.

At a time point t2*d*, the second switch SW2 may be turned on. Accordingly, the first electrode of the sensing capacitor Css may be initialized with the initialization voltage Vint.

At a time point t3*d*, the first switch SW1 may be turned off. Accordingly, as current is supplied from the first power source line ELVDD, voltages of the second node N2 and the third node N3 may increase. When the voltages of the second node N2 and the third node N3 rise to a voltage Vref1-Vth, the transistor T1 may be turned off, and the voltages of the second node N2 and the third node N3 may no longer rise. Since the fourth node N4 is connected to the third node N3 through the turned on second switch SW2, a sensing voltage Vref1-Vth may be stored in the first electrode of the sensing capacitor Css.

At a time point t4*d*, as the second switch SW2 is turned off, the sensing voltage Vref1-Vth of the first electrode of the sensing capacitor Css may be maintained. The sensing circuit 15 may perform analog-to-digital conversion of the sensing voltages Vref1-Vth, and thus may determine a threshold voltage Vth of the transistor T1 of the pixel PXij.

At a time point t5*d*, a first scan signal of a turn-off level may be supplied to the first scan line S1*i*, and a second scan signal of a turn-off level may be supplied to the second scan line S2*i*. Also, the first switch SW1 may be turned on. Accordingly, the initialization voltage Vint may be applied to the third node N3.

Figure 16:
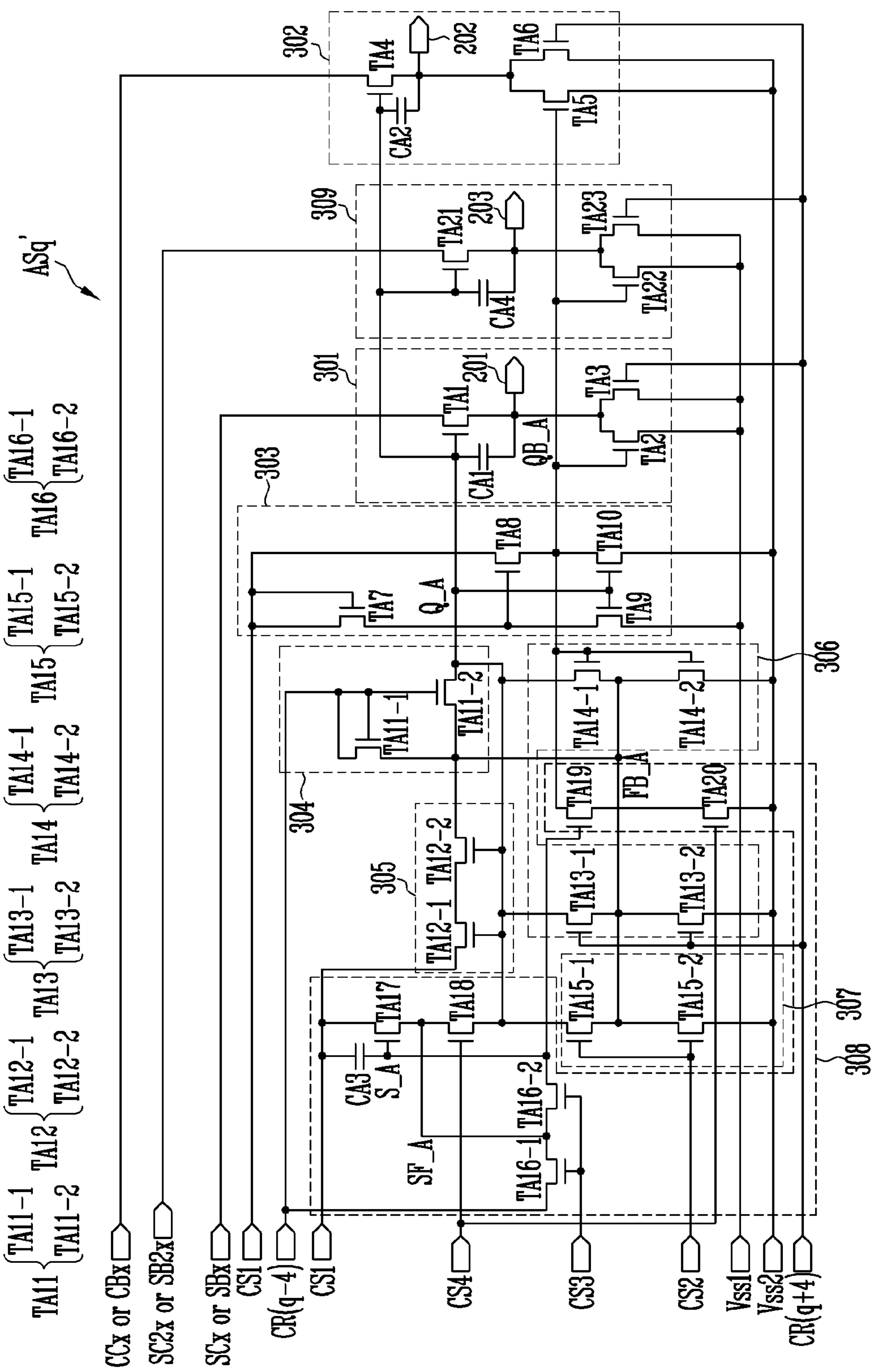
FIG. 16 is a diagram for explaining an active stage according to another embodiment of the present invention.

FIG. 16 is a diagram for explaining an active stage according to another embodiment of the present invention.

An active stage ASq' of FIG. 16 may be different from the active stage ASq of FIG. 8 in that it further includes an additional scan output circuit 309.

The additional scan output circuit 309 may output an additional scan clock signal SC2*x* or SB2*x* to a third output terminal 203 when the voltage of the first active node Q_A is at the logic high level, and may output a scan signal of a turn-off level to the third output terminal 203 when the voltage of the second active node Q_A or the first carry signal CR(q+4) is at the logic high level.

The additional scan output circuit 309 may include twenty-first to twenty-third transistors TA21, TA22, and TA23 and a fourth capacitor CA4. The twenty-first transistor TA21 may have a first electrode, which receives the additional scan clock signal SC2*x* or SB2*x*, a gate electrode connected to the first active node Q_A, and a second electrode connected to the third output terminal 203. The fourth capacitor CA4 may have a first electrode connected to the first active node Q_A and a second electrode connected to the third output terminal 203. The twenty-second transistor TA22 may have a first electrode connected to the third output terminal 203, a gate electrode connected to the second active node QB_A, and a second electrode, which receives the first low voltage Vss1. The twenty-third transistor TA23 may have a first electrode connected to the third output terminal 203, a gate electrode, which receives the first carry signal CR(q+4), and a second electrode, which receives the first low voltage Vss1.

According to the present embodiment, the first scan signal may be output through the first output terminal 201, and independently of this, the second scan signal may be output through the third output terminal 203. Accordingly, a sensing method shown in FIGS. 16 and 17, which will be described later, may be additionally used by variously setting timings of the first scan signal and the second scan signal.

Figure 17:
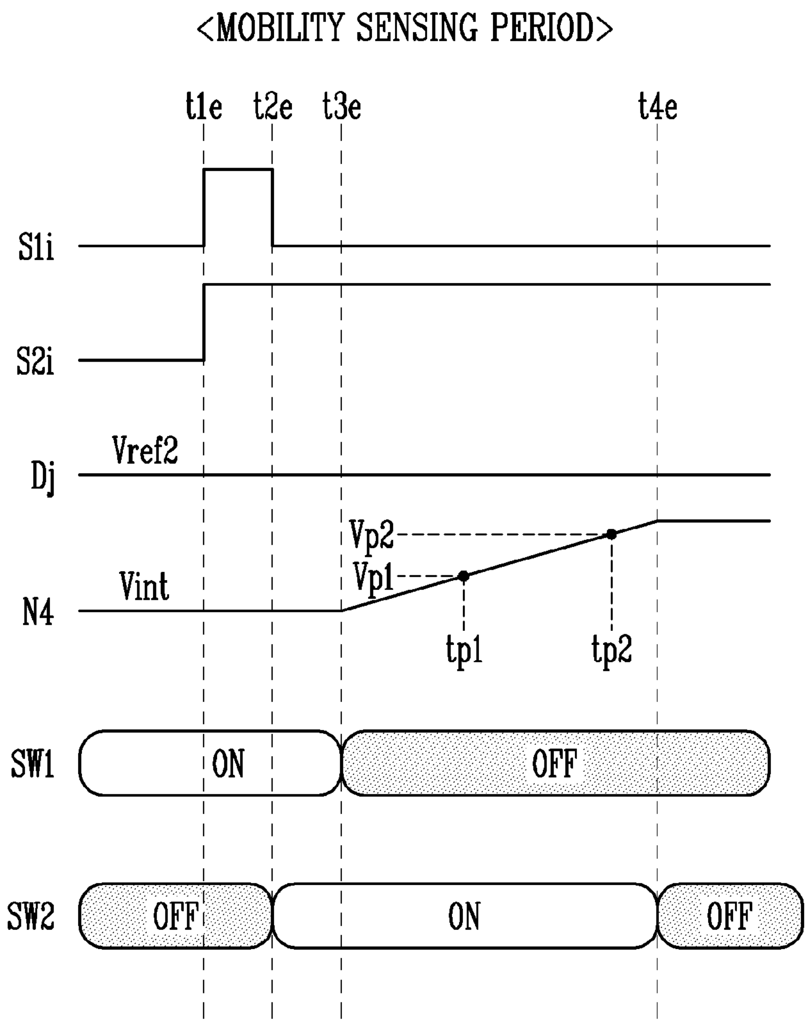
FIG. 17 is a diagram for explaining a mobility sensing period according to an embodiment of the present invention.

FIG. 17 is a diagram for explaining a mobility sensing period according to an embodiment of the present invention.

At a time point t1*e*, a first scan signal of a turn-on level may be applied to the first scan line S1*i*, and a second scan signal of a turn-on level may be applied to the second scan line S2*i*. In this case, since a reference voltage Vref2 is applied to the data line Dj, the reference voltage Vref2 may be applied to the first node N1. Also, since the first switch SW1 is turned on, the initialization voltage Vint may be applied to the second node N2 and the third node N3. Accordingly, the transistor T1 may be turned on according to a difference between a gate voltage and a source voltage.

At a time point t2*e*, as a first scan signal of a turn-off level is applied to the first scan line S1*i*, the first node N1 may be in a floating state. Also, as the second switch SW2 is turned on, the initialization voltage Vint may be applied to the fourth node N4.

At a time point t3*e*, the first switch SW1 may be turned off. Accordingly, as current is supplied from the first power source line ELVDD through the transistor T1, voltages of the second, third, and fourth nodes N2, N3, and N4 may increase. In this case, since the first node N1 is in a floating state, the difference between the gate voltage and the source voltage of the transistor T1 may be maintained.

At a time point toe, the second switch SW2 may be turned off. Accordingly, a sensing voltage may be stored in the first electrode of the sensing capacitor Css. A sensing current of the transistor T1 can be obtained as in Equation 1 below.

$$I=C*(Vp2-Vp1)/(tp2-tp1) \quad \text{[Equation 1]}$$

In this case, I may be the sensing current of the transistor T1, C may be a capacitance of the sensing capacitor Css, Vp2 may be the sensing voltage at a time point tp1, and Vp1 may be the sensing voltage at a time point tp2.

Assuming that a voltage slope of the fourth node N4 is linear between the time point t3*e* and the time point t4*e*, the sensing voltage Vp1 at the time point tp1 and the sensing voltage Vp2 at the time point tp2 can be seen. Therefore, the sensing current of the transistor T1 can be calculated. Also, the mobility of the transistor T1 can be calculated using the calculated sensing current. For example, as the sensing current increases, the mobility may also increase. For example, the magnitude of the mobility may be proportional to the magnitude of the sensing current.

Figure 18:
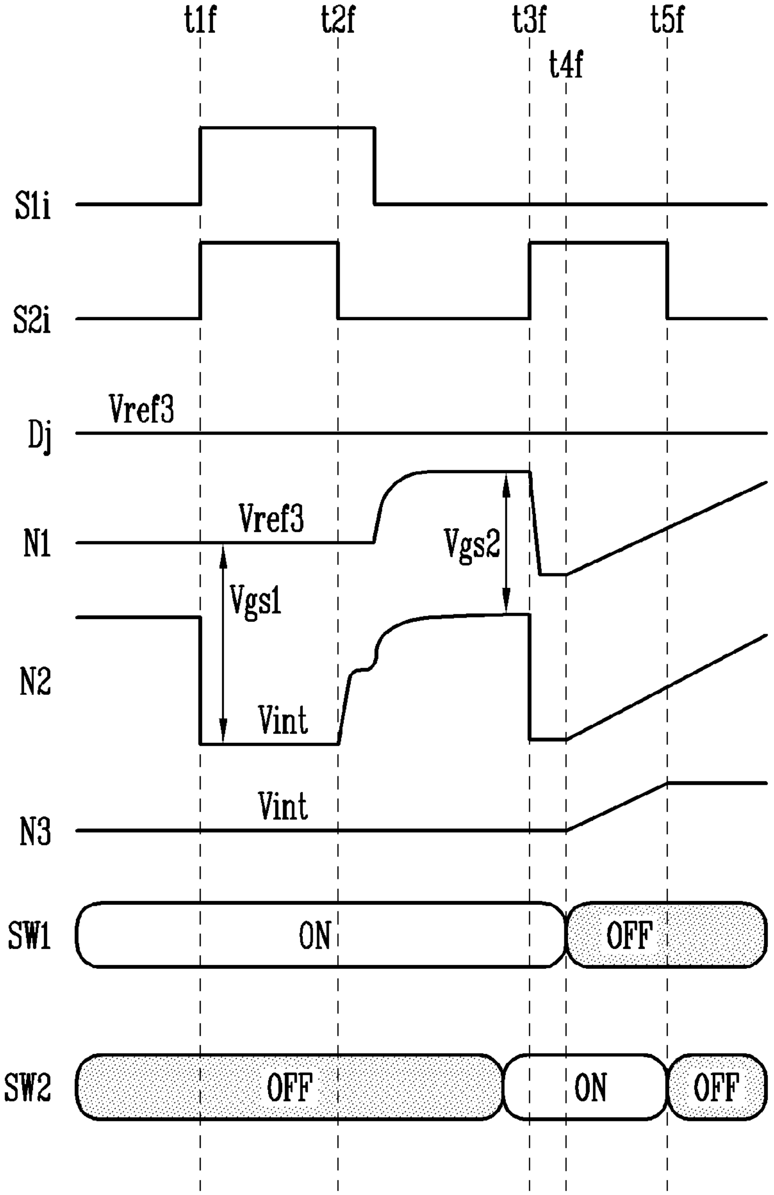
FIG. 18 is a diagram for explaining a threshold voltage sensing period of a light emitting element according to an embodiment of the present invention.

FIG. 18 is a diagram for explaining a threshold voltage sensing period of a light emitting element according to an embodiment of the present invention.

At a time point t1*f*, a first scan signal of a turn-on level may be applied to the first scan line S1*i*, and a second scan signal of a turn-on level may be applied to the second scan line S2*i*. In this case, since a reference voltage Vref3 is applied to the data line Dj, the reference voltage Vref3 may be applied to the first node N1. Since the first switch SW1 is turned on, the initialization voltage Vint may be applied to the second node N2 and the third node N3. Accordingly, the transistor T1 may be turned on according to a gate-source voltage Vgs1.

At a time point t2*f*, a second scan signal of a turn-off level may be applied to the second scan line S2*i*. Also, a first scan signal of a turn-off level may be applied to the first scan line S1*i* at the time point t2*f* or immediately thereafter. In this case, a voltage of the second node N2 may be increased by the current supplied from the first power source line ELVDD. In addition, a voltage of the first node N1 coupled to the second node N2 and in a floating state may also increase. In this case, the voltage of the second node N2 may be saturated to a voltage corresponding to a threshold voltage of the light emitting element LD. As the degree of deterioration of the light emitting element LD increases, the voltage of the saturated second node N2 may be increased. A gate-source voltage Vgs2 of the transistor T1 may be reset by the voltage of the saturated second node N2. For example, the reset gate-source voltage Vgs2 may be less than a predetermined gate-source voltage Vgs1.

At a time point t3*f*, a second scan signal of a turn-on level may be applied to the second scan line S2*i*. Accordingly, the initialization voltage Vint may be applied to the second node N2. In this case, the reset gate-source voltage Vgs2 may be maintained by the storage capacitor Cst.

At a time point t4*f*, the first switch SW1 may be turned off. In this case, since the second switch SW2 is in a turned-on state, voltages of the second node N2, the third node N3, and the fourth node N4 may increase. As the degree of deterioration of a light emitting element Lg (or the threshold voltage of the light emitting element LD) increases, the slope of the voltage increase may be small.

At a time point t5*f*, a second scan signal of a turn-off level may be applied to the second scan line S2*i*, and the second switch SW may be turned off. Accordingly, the threshold voltage of the light emitting element LD may be calculated using the sensing voltage stored in the sensing capacitor Css.

The display device according to the present invention may sequentially apply the scan signals to the scan lines during the image display period and simultaneously apply the scan signals to the scan lines during the black display period.

The drawings referred to heretofore and the detailed description of the invention described above are merely illustrative of the invention. It is to be understood that the invention has been disclosed for illustrative purposes only and is not intended to limit the meaning or scope of the invention as set forth in the claims. Therefore, those skilled in the art will appreciate that various modifications and equivalent embodiments are possible without departing from the scope of the invention. Accordingly, the true technical protection scope of the invention should be determined by the technical idea of the appended claims.

What is claimed is:

1. A display device comprising:

pixels connected to scan lines, data lines and sensing lines;

a scan driver, which supplies scan signals to the scan lines;

a data driver, which applies data voltages to the data lines;

a sensing circuit, which receives sensing voltages from the sensing lines; and a timing controller, which controls the scan driver, the data driver and the sensing circuit, wherein the scan driver includes active stages having first output terminals connected to the scan lines, and wherein each of the active stages includes:

a scan output circuit, which outputs a scan clock signal to a first output terminal when a voltage of a first active node is at a logic high level, and, outputs a scan signal of a turn-off level to the first output terminal when a voltage of a second active node or a first carry signal is at a logic high level;

a carry output circuit, which outputs a carry clock signal to a second output terminal when the voltage of the first active node is at the logic high level, and, outputs a carry signal of a turn-off level to the second output terminal when the voltage of the second active node or the first carry signal is at the logic high level;

an inverter, which charges the second active node with the voltage of the logic high level when the voltage of the first active node is at a logic low level and a first control signal is at a logic high level; and a feedback circuit, which charges a third active node with the first control signal when the voltage of the first active node is at the logic high level, wherein intervals between pulses of the carry clock signal generated during one frame period are the same, wherein at least two of intervals between pulses of the scan clock signal generated during the one frame period are different from each other, and wherein the feedback circuit includes:

a twelfth transistor having a first electrode, which receives the first control signal, a gate electrode connected to the first active node, and a second electrode connected to the third active node.

2. The display device of claim 1, wherein the scan output circuit includes:

a first transistor having a first electrode, which receives the scan clock signal, a gate electrode connected to the first active node, and a second electrode connected to the first output terminal;

a first capacitor having a first electrode connected to the first active node and a second electrode connected to the first output terminal;

a second transistor having a first electrode connected to the first output terminal, a gate electrode connected to the second active node, and a second electrode, which receives a first low voltage; and a third transistor having a first electrode connected to the first output terminal, a gate electrode, which receives the first carry signal, and a second electrode, which receives the first low voltage.

3. The display device of claim 2, wherein the carry output circuit includes:

a fourth transistor having a first electrode, which receives the carry clock signal, a gate electrode connected to the first active node, and a second electrode connected to the second output terminal;

a second capacitor having a first electrode connected to the first active node and a second electrode connected to the second output terminal;

a fifth transistor having a first electrode connected to the second output terminal, a gate electrode connected to the second active node, and a second electrode, which receives a second low voltage; and a sixth transistor having a first electrode connected to the second output terminal, a gate electrode, which receives the first carry signal, and a second electrode, which receives the second low voltage.

4. The display device of claim 1, wherein the inverter includes:

a seventh transistor having a first electrode and a gate electrode, which receive the first control signal, and a second electrode;

an eighth transistor having a first electrode, which receives the first control signal, a gate electrode connected to the second electrode of the seventh transistor, and a second electrode connected to the second active node;

a ninth transistor having a first electrode connected to the gate electrode of the eighth transistor, a gate electrode connected to the first active node, and a second electrode, which receives the first low voltage; and a tenth transistor having a first electrode connected to the second active node, a gate electrode connected to the first active node, and a second electrode, which receives the second low voltage.

5. The display device of claim 4, wherein each of the active stages further includes:

a charging circuit, which charges the first active node with the voltage of the logic high level when a second carry signal is at a logic high level, wherein the charging circuit includes:

an eleventh transistor having a first electrode and a gate electrode, which receive the second carry signal, and a second electrode connected to the first active node.

6. The display device of claim 1, wherein each of the active stages further includes:

a stabilization circuit, which applies the second low voltage to the first active node when the first carry signal or the voltage of the second active node is at the logic high level, wherein the stabilization circuit includes:

a thirteenth transistor having a first electrode connected to the first active node, a gate electrode, which receives the first carry signal, and a second electrode, which receives the second low voltage; and a fourteenth transistor having a first electrode connected to the first active node, a gate electrode connected to the second active node, and a second electrode, which receives the second low voltage.

7. The display device of claim 6, wherein each of the active stages further includes:

an initialization circuit, which applies the second low voltage to the first active node when a second control signal is at a logic high level, wherein the initialization circuit includes:

a fifteenth transistor having a first electrode connected to the first active node, a gate electrode, which receives the second control signal, and a second electrode, which receives the second low voltage.

8. The display device of claim 7, wherein each of the active stages further includes:

a sampling circuit, which samples the second carry signal when a third control signal is at a logic high level, and transmits the first control signal to the first active node when a sampled second carry signal and a fourth control signal are at a logic high level, wherein the sampling circuit includes:

a third capacitor having a first electrode, which receives the first control signal and a second electrode connected to a fourth active node;

a sixteenth transistor having a first electrode, which receives the second carry signal, a gate electrode, which receives the third control signal, and a second electrode connected to the fourth active node;

a seventeenth transistor having a first electrode, which receives the first control signal, a gate electrode connected to the fourth active node, and a second electrode;

an eighteenth transistor having a first electrode connected to the second electrode of the seventeenth transistor, a gate electrode, which receives the fourth control signal, and a second electrode connected to the first active node;

a nineteenth transistor having a first electrode connected to the second active node, a gate electrode connected to the fourth active node, and a second electrode; and a twentieth transistor having a first electrode connected to the second electrode of the nineteenth transistor, a gate electrode, which receives the fourth control signal, and a second electrode, which receives the second low voltage.

9. The display device of claim 8, wherein each of the active stages further includes:

an additional scan output circuit, which outputs an additional scan clock signal to a third output terminal when the voltage of the first active node is at the logic high level, and outputs a scan signal of a turn-off level to the third output terminal when the voltage of the second active node or the first carry signal is at the logic high level, wherein the additional scan output circuit includes:

a twenty-first transistor having a first electrode, which receives the additional scan clock signal, a gate electrode connected to the first active node, and a second electrode connected to the third output terminal;

a fourth capacitor having a first electrode connected to the first active node and a second electrode connected to the third output terminal;

a twenty-second transistor having a first electrode connected to the third output terminal, a gate electrode connected to the second active node, and a second electrode, which receives the first low voltage; and a twenty-third transistor having a first electrode connected to the third output terminal, a gate electrode, which receives the first carry signal, and a second electrode, which receives the first low voltage.

10. The display device of claim 1, wherein the scan clock signal sequentially includes a first pulse, a second pulse, a third pulse, a fourth pulse, and a fifth pulse, wherein the carry clock signal sequentially includes a sixth pulse, a seventh pulse, an eighth pulse, a ninth pulse, and a tenth pulse, wherein the first pulse and the sixth pulse are generated at a same timing, wherein the second pulse and the seventh pulse are generated at a same timing, wherein the third pulse and the eighth pulse are generated at different timings from each other, wherein the fourth pulse and the ninth pulse are generated at different timings from each other, and wherein the fifth pulse and the tenth pulse are generated at a same timing.

11. The display device of claim 10, wherein a period from a time point at which the first pulse is generated to a time point at which the fifth pulse is generated corresponds to the one frame period.

12. The display device of claim 1, wherein the scan driver further includes b front dummy stages and b back dummy stages, wherein b is an integer greater than 0, wherein first output terminals of the b front dummy stages and b back dummy stages are not connected to the scan lines, wherein each of the active stages supplies the first carry signal to an active stage that is b stages ahead or a front dummy stage through the second output terminal, and supplies the first carry signal to an active stage that is b stages behind or a back dummy stage through the second output terminal, wherein each of the front dummy stages supplies the first carry signal to the active stage that is b stages behind, and wherein each of the back dummy stages supplies the first carry signal to the active stage that is b stages ahead.

13. The display device of claim 1, wherein the one frame period includes an image display period in which an image is displayed and a black display period in which the image is not displayed, wherein the scan clock signal includes a first pulse and a second pulse during the image display period, and includes a third pulse and a fourth pulse during the black display period, and wherein each of widths of the first pulse and the second pulse are greater than each of widths of the third pulse and the fourth pulse.

14. The display device of claim 13, wherein an interval between the first pulse and the second pulse is different from an interval between the second pulse and the third pulse.

15. The display device of claim 1, wherein the scan driver receives first scan clock signals and second scan clock signals, wherein the active stages are divided into a plurality of groups, wherein each of the groups includes the same number of active stages as the number of the first scan clock signals, and wherein two consecutive groups of the plurality of groups receive the first scan clock signals of the first and second scan clock signals, and next two consecutive groups of the plurality of groups receive the second scan clock signals of the first and second scan clock signals.

16. The display device of claim 15, wherein the scan driver receives first carry clock signals and second carry clock signals, and wherein two consecutive groups of the plurality of groups receive the first carry clock signals of the first and second carry clock signals, and next two consecutive groups of the plurality of groups receive the second scan clock signals of the first and second scan clock signals.

17. The display device of claim 16, wherein the one frame period includes an image display period in which an image is displayed and a black display period in which the image is not displayed, wherein a total number of the first scan clock signals are 2n, and n is an integer greater than 0, wherein in the image display period, a first pulse of a first scan clock signal to an n-th pulse of the first scan clock signal are sequentially generated at a first time interval between two adjacent pulses, an (n+1)th pulse of the first scan clock signal is generated after a second time interval from a time point at which the n-th pulse of the first scan clock signal is generated, and thereafter, an (n+2)th pulse of the first scan clock signal to a 2n-th pulse of the first scan clock signal are sequentially generated at the first time interval between two adjacent pulses, and wherein the second time interval is longer than the first time interval.

18. The display device of claim 17, wherein in the black display period, pulses of the first scan clock signals are generated simultaneously.

19. The display device of claim 1, wherein the timing controller generates compensated grayscales by compensating input grayscales for the pixels based on the sensing voltages.

20. The display device of claim 19, wherein the one frame period includes an image display period in which an image is displayed and a black display period in which the image is not displayed, wherein during the image display period, the data driver applies the data voltages corresponding to the compensated grayscales to the data lines.

21. The display device of claim 20, wherein during the black display period, the data driver applies the data voltages corresponding to a black grayscale to the data lines.

22. The display device of claim 20, wherein during the image display period or the black display period, the sensing circuit supplies an initialization voltage to the sensing lines.

23. The display device of claim 1, wherein the data driver and the sensing circuit are integrated.

* * * * *